(12) United States Patent
Mizuo

(10) Patent No.: US 11,183,954 B2
(45) Date of Patent: Nov. 23, 2021

(54) MOTOR DRIVING DEVICE AND CONTROL METHOD THEREOF

(71) Applicant: CANON KABUSHIKI KAISHA, Tokyo (JP)

(72) Inventor: Yoshihiro Mizuo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/518,150

(22) Filed: Jul. 22, 2019

(65) Prior Publication Data

US 2020/0052619 A1 Feb. 13, 2020

(30) Foreign Application Priority Data

Aug. 9, 2018 (JP) .............................. JP2018-150571
Nov. 29, 2018 (JP) .............................. JP2018-224124
Jun. 24, 2019 (JP) .............................. JP2019-116463

(51) Int. Cl.
*H02P 6/15* (2016.01)

(52) U.S. Cl.
CPC .................................... *H02P 6/153* (2016.02)

(58) Field of Classification Search
CPC .. H02P 6/153; H02P 2203/05; H02P 2203/09; H02P 6/18; H02P 6/16
See application file for complete search history.

(56) References Cited

U.S. PATENT DOCUMENTS

| 4,451,782 A * | 5/1984 | Ashida | G01R 27/28 |
| | | | 324/76.26 |
| 6,456,671 B1 * | 9/2002 | Patire | H04L 27/2273 |
| | | | 375/323 |
| 7,268,537 B2 * | 9/2007 | Nakano | G01D 5/2046 |
| | | | 310/68 B |
| 7,839,113 B2 * | 11/2010 | Maeda | H02P 21/06 |
| | | | 318/721 |
| 10,389,283 B2 * | 8/2019 | Mizuo | H02P 8/34 |
| 10,439,525 B2 * | 10/2019 | Mizuo | H02P 6/20 |
| 10,461,675 B2 * | 10/2019 | Ishikawa | H02P 6/153 |
| 2014/0035496 A1 * | 2/2014 | Mizuo | H02P 6/15 |
| | | | 318/400.17 |
| 2017/0223257 A1 * | 8/2017 | Tani | G02B 7/09 |
| 2018/0069496 A1 * | 3/2018 | Mizuo | H02P 8/18 |

FOREIGN PATENT DOCUMENTS

JP 2017-134269 A 8/2017

* cited by examiner

*Primary Examiner* — Muhammad S Islam
*Assistant Examiner* — Devon A Joseph
(74) *Attorney, Agent, or Firm* — Venable LLP

(57) ABSTRACT

A motor driving device includes an OPEN driving mode in which a driving waveform is generated without using detection information of a rotational position of a rotor and the rotor is rotated, and a CLOSE driving mode in which a phase of a rotational position and a phase of a driving waveform are synchronized using the detection information of the rotational position of the rotor, a desired phase difference is set between the rotational position and the driving waveform, and the rotor is rotated. The CPU controls rotation of the rotor using the OPEN driving mode, instructs a driving waveform generating circuit to set a phase difference for generating a torque in a reversing direction when rotation of the rotor is reversed, switches to the CLOSE driving mode, and then switches to the OPEN driving mode again when reversing has been completed.

10 Claims, 24 Drawing Sheets

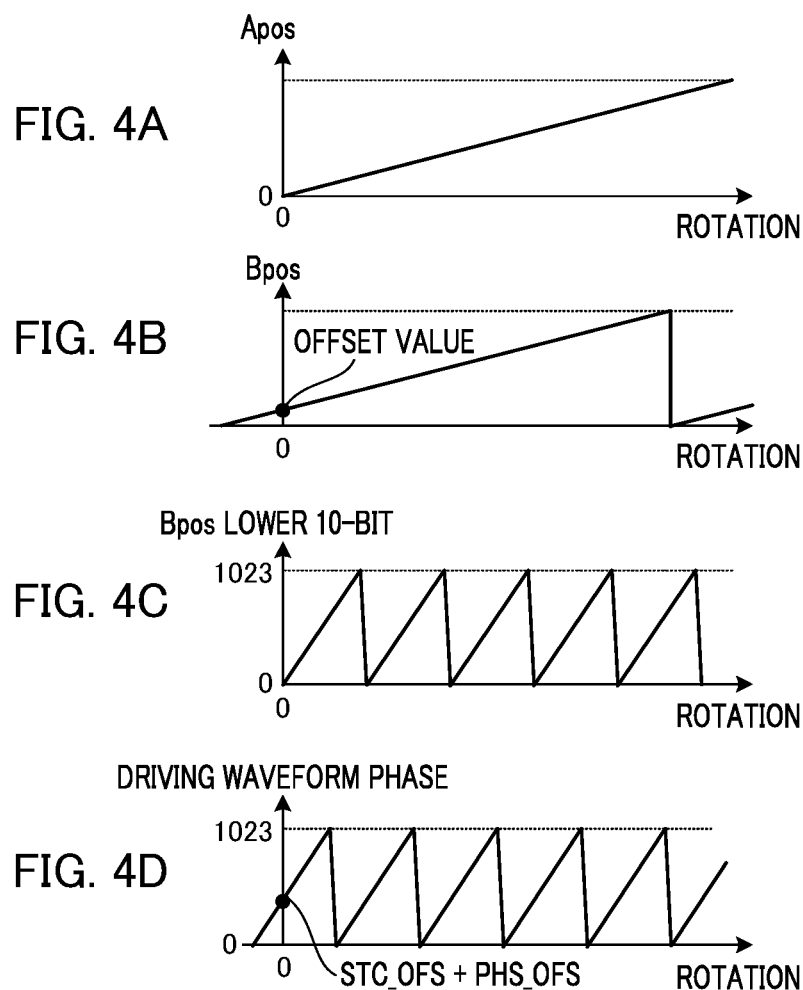

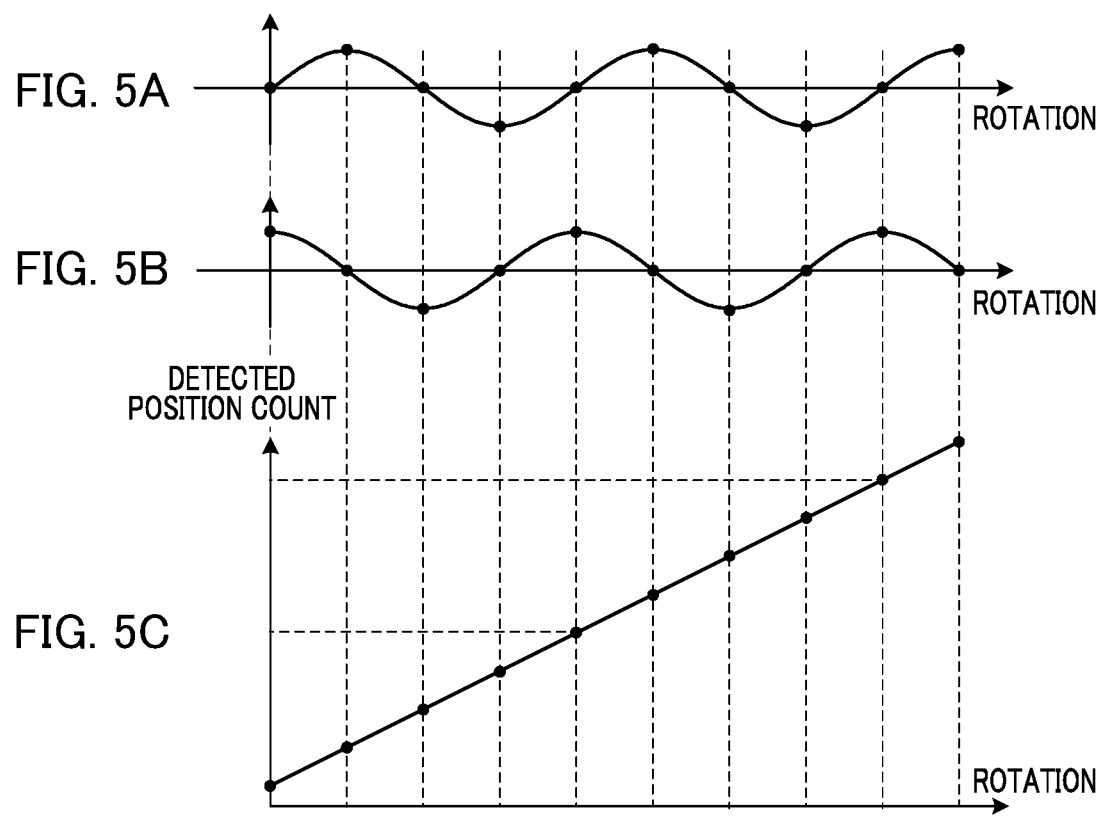

MOTOR DRIVING DEVICE AND CONTROL METHOD THEREOF

BACKGROUND OF THE INVENTION

Field of the Invention

The present invention relates to a technique of generating an efficient driving waveform depending on a detected rotational position of a rotor.

Description of the Related Art

In closed-loop control for a motor, there is a technique of realizing efficient control by applying a driving waveform to the motor on the basis of a rotational position detected by a rotational position detecting mechanism of a rotor. For example, there is a technique of executing open-loop control and closed-loop control together at a characteristic rotational position such as start, stop, and reversal of rotation of a rotor. Japanese Patent Laid-Open No. 2017-134269 discloses a technique of suppressing vibration at the time of start of rotation by intentionally using open-loop control at the time of start of rotation and then using closed-loop control. In a lens driving device disclosed in Japanese Patent Laid-Open No. 2017-134269, a speed at which a position of a stepping motor advances in open-loop control in start of movement of a lens is changed on the basis of a fixed speed pattern and is increased, and closed-loop control is performed when a speed corresponding to the speed pattern reaches a predetermined value.

However, in the related art, a stable motion with loss of synchronism suppressed or an effect of reducing a reversing time cannot be expected in driving control of reversing a rotation direction when stable constant-speed rotational driving is being performed in open-loop control.

SUMMARY OF THE INVENTION

According to an embodiment of the present invention, there is provided a motor driving device that rotationally drives a rotor, including: a generation unit configured to acquire an output of a detection unit configured to detect a rotational position of the rotor and to generate a driving waveform; and a control unit configured to execute control for synchronizing a phase of the rotational position with a phase of the driving waveform. The generation unit includes a setting unit configured to set a phase difference between the rotational position and the driving waveform in a state in which the phase of the rotational position and the phase of the driving waveform are synchronized with each other. The control unit executes control for switching between a first driving mode in which the rotor rotates in accordance with the driving waveform which is generated by the generation unit without using the output of the detection unit and a second driving mode in which the rotor rotates in accordance with the driving waveform which is generated by the generation unit from the phase difference set by the setting unit using the output of the detection unit. The control unit executes control for switching to the second driving mode when rotation of the rotor is reversed in a second rotation direction after control for causing the rotor to rotate in a first rotation direction in the first driving mode has been executed, causes the setting unit to set the phase difference for generating a torque in the second rotation direction, and switches to the first driving mode again after rotation of the rotor has been reversed.

Further features of the present invention will become apparent from the following description of exemplary embodiments with reference to the attached drawings.

BRIEF DESCRIPTION OF THE DRAWINGS

FIGS. 4A to 4D are diagrams illustrating processes which are performed by the position ENC circuit and the driving waveform generating circuit in the embodiment;

FIGS. 5A to 5C are diagrams illustrating a relationship between a position sensor signal and a detected position count in the embodiment;

DESCRIPTION OF THE EMBODIMENTS

Hereinafter, exemplary embodiments of the present invention will be described in detail with reference to the attached drawings. In a first embodiment and a second embodiment which will be described below, an example of motor driving control in which switching between first and second driving modes is performed will be described. The first driving mode is a driving mode in which a rotor is rotated in accordance with a driving waveform which is generated without using an output of a position detecting unit configured to detect a rotational position of the rotor. In the first driving mode, OPEN driving is performed by open-loop control. The second driving mode is a driving mode in which a rotor is rotated in accordance with a driving waveform which is generated on the basis of a set phase difference using an output of the position detection unit of the rotor. In the second driving mode, CLOSE driving is performed by closed loop control in which a phase of a detected rotational position of the rotor and a phase of the driving waveform are synchronized.

First Embodiment

Figure 1:
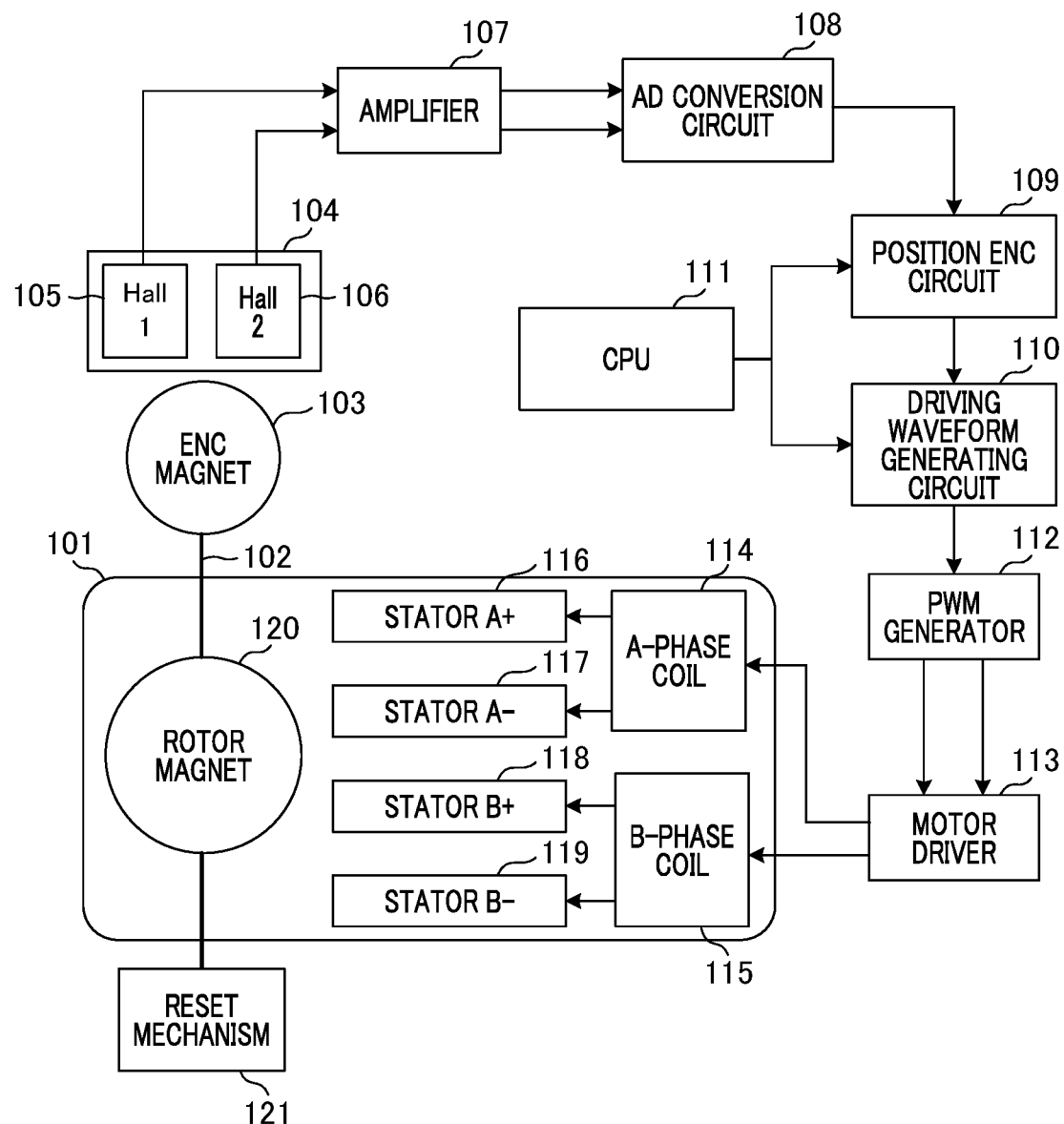
FIG. 1 is a block diagram schematically illustrating a system according to an embodiment of the present invention.

FIG. 1 is a diagram illustrating a configuration of a system including an electrical circuit for driving according to an embodiment. A stepping motor (hereinafter simply referred to as a motor) 101 includes an ENC (encoding) magnet 103 in a rotor shaft 102. The ENC magnet 103 is magnetized such that a magnetic field generated on a circular circumference centered on a rotation shaft generates a magnetic field of a sine wave shape depending on a rotational position. The motor 101 includes a reset mechanism 121. The reset mechanism 121 is configured to output a signal which changes at a specific position with rotation of the rotor shaft 102. This signal is a signal for providing a reference of an absolute value of a rotational position of the motor. As the reset mechanism 121, a slit is formed in a moving object that carries out a translational motion with rotation of the rotor shaft 102 which also serves as a screw shaft. When the slit shields a photo interrupter, the output signal thereof changes.

A Hall element package 104 is a magnetic detection unit of the ENC magnet 103 and includes a plurality of Hall elements 105 and 106. For example, the Hall elements 105 and 106 detect change of a magnetic field due to rotation of the ENC magnet 103 at positions thereof and output detection signals to an amplifier 107. A specific example will be described below with reference to FIGS. 2A to 2C.

Figure 2A:
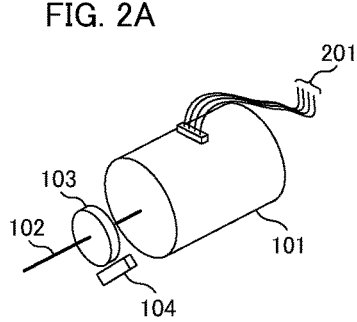
FIGS. 2A to 2C are diagrams illustrating a motor and a position sensor in the embodiment.

FIG. 2A is a perspective view illustrating an appearance example of the motor 101. The ENC magnet 103 having a short cylindrical shape is provided in the rotor shaft 102 of the motor 101. The Hall element package 104 is disposed at a position at which a magnetic field generated by the ENC magnet 103 can be detected. A wiring member 201 is drawn out from the motor 101, and the wiring member 201 is connected to a motor driver 113 which will be described later.

Figure 2B:
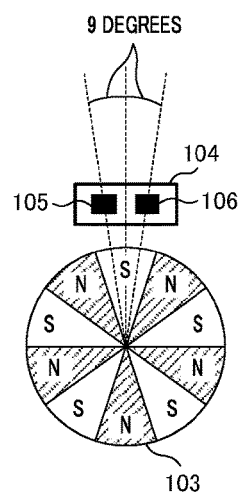

FIG. 2B is a diagram schematically illustrating a positional relationship between the ENC magnet 103 and the Hall elements 105 and 106. The ENC magnet 103 is a 10-pole magnet, where the number of areas of the N pole and the number of areas of the S pole are five and areas every 36 degrees are magnetized. The Hall elements 105 and 106 are disposed at equal distances from the central position if seen from the central position of the ENC magnet 103. The angle between the Hall elements 105 and 106 with respect to the central position, that is, a physical angle (a physical angle) of the two Hall elements with respect to the central position, is 18 degrees. A signal phase which is detected by the two Hall elements is a phase difference of 90 degrees.

The amplifier 107 illustrated in FIG. 1 amplifies weak signals which are input from the Hall elements 105 and 106 and outputs the amplified signals to an AD conversion circuit 108 in a subsequent stage. The AD conversion circuit 108 converts an analog voltage signal which is input from the amplifier 107 into a digital signal to digitize the signal and outputs the conversion result as a digital numerical signal to a position ENC circuit 109.

The position ENC circuit 109 performs a process of encoding a signal which is input from the AD conversion circuit 108. The position ENC circuit 109 includes a processing unit that adjusts offsets and gains of two input signals. The position ENC circuit 109 generates a TAN value (a tangent value) from two adjusted signals, performs an ArcTAN operation (an arctangent operation) thereon, and generates rotational angle information. Rotational position information is generated by integrating the rotational angle information. The generated rotational position information is supplied to a driving waveform generating circuit 110.

The driving waveform generating circuit 110 generates a driving waveform for the motor 101. The driving waveform generating circuit 110 switches between OPEN driving and CLOSE driving. OPEN driving is driving in which sine wave signals having different driving phases at a preset frequency are output. CLOSE driving is driving in which a driving waveform interlocking with the position ENC circuit 109 is output. Switching between the OPEN driving and the CLOSE driving is performed in accordance with a command from a central processing unit (CPU) 111.

The CPU 111 commands the driving waveform generating circuit 110 to switch between the OPEN driving and the CLOSE driving and sets a frequency and an amplitude gain value of a sine wave signal which is output in the OPEN driving. The CPU 111 performs initialization setting of a position count value or the like for the position ENC circuit 109. The processes which are performed by the position ENC circuit 109 and the driving waveform generating circuit 110 will be described later with reference to FIGS. 4A to 4D and FIGS. 5A to 5C.

A pulse width modulation (PWM) generator 112 outputs a PWM signal to a motor driver 113 in response to a PWM command value which is output from the driving waveform generating circuit 110. A PWM signal will be described later with reference to FIGS. 6A and 6B.

Figure 6A:
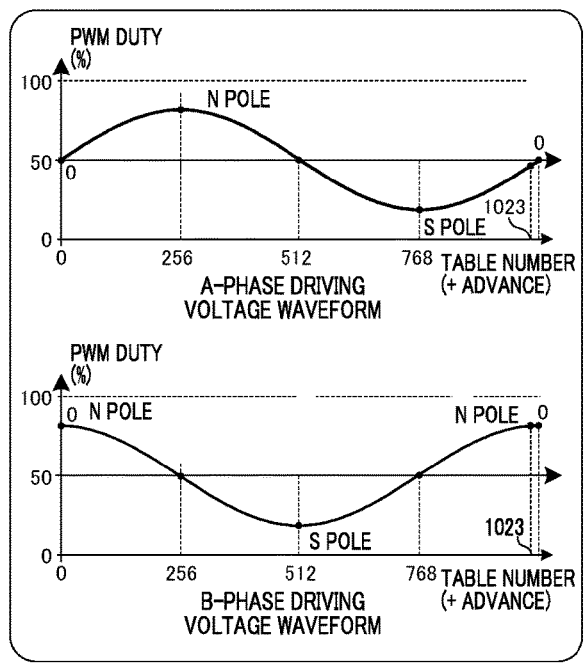
FIGS. 6A and 6B are diagrams illustrating a relationship between a driving waveform and a phase count in the embodiment.
Figure 6B:
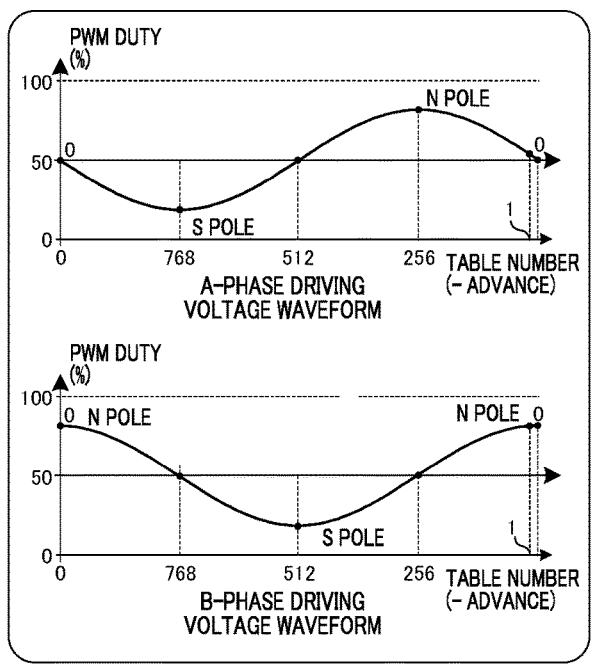

The motor driver 113 performs amplification based on a command value which is output from the PWM generator 112 and applies voltages to an A-phase coil 114 and a B-phase coil 115 of the motor 101. A signal which is applied to the motor 101 is a high-frequency voltage signal based on a PWM signal, and a signal of a current value which is generated in a coil is the same as that when a low-pass filter (LPF) is applied due to an inductance (L) component of the coil. Accordingly, it is assumed that a voltage of a sine wave shape which is illustrated in FIGS. 6A and 6B is effectively applied to the coil.

A stator A+ 116 and a stator A− 117 have a function of concentrating and discharging magnetic fields which are generated at both ends of an A-phase coil. A stator B+ 118 and a stator B− 119 have a function of concentrating and discharging magnetic fields which are generated at both ends of a B-phase coil. An arrangement relationship of the stators A+ and A−, the stators B+ and B−, and the rotor magnet 120 will be specifically described below with reference to FIG. 2C.

Figure 2C:
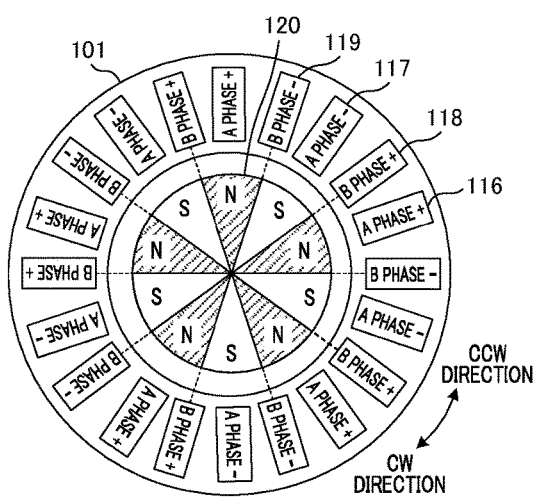

In FIG. 2C, the stator A+ 116, the stator A− 117, the stator B+ 118, and the stator B− 119 are arranged to have a positional relationship of physical angles of 18 degrees each. The rotation direction of the rotor magnet 120 is a clockwise (CW) direction or a counterclockwise (CCW) direction. In this example, a total of five sets of stator groups are arranged. The rotor magnet 120 is located at the center of the stator groups and a total of ten poles including five N poles and five S poles. Whenever one sine wave of a driving waveform is output, the rotor magnet 120 rotates by a physical angle of 72 degrees.

Figure 3:
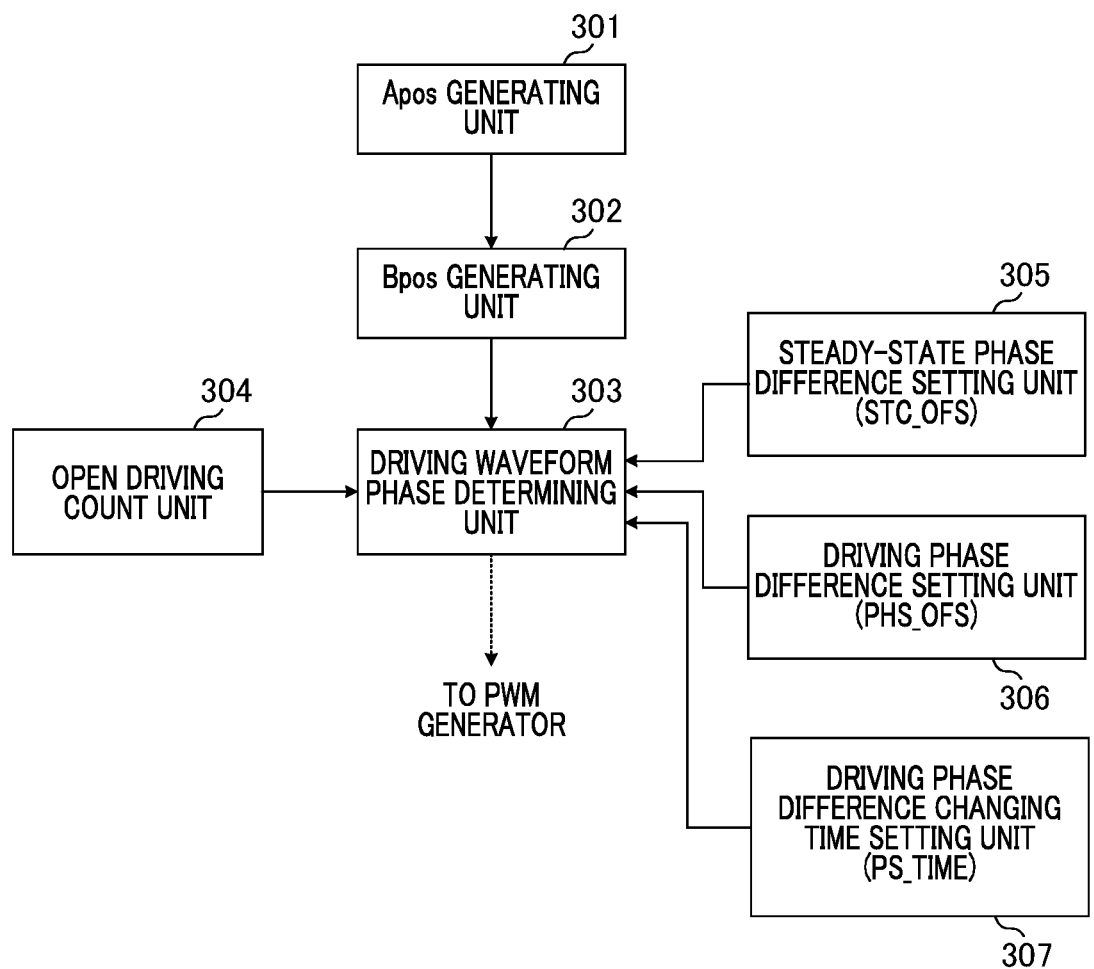
FIG. 3 is a block diagram illustrating a position ENC circuit and a driving waveform generating circuit in the embodiment.

Processes which are performed by the position ENC circuit 109 and the driving waveform generating circuit 110 will be described below in detail. FIG. 3 is a block diagram illustrating the configurations of the position ENC circuit 109 and the driving waveform generating circuit 110. An Apos generating unit 301 and a Bpos generating unit 302 correspond to the position ENC circuit 109. Units from a driving waveform phase determining unit 303 to a driving phase difference changing time setting unit 307 correspond to the driving waveform generating circuit 110.

An output signal of the Hall element 105 is referred to as sensor signal 1 and an output signal of the Hall element 106 is referred to as sensor signal 2. Sensor signals 1 and 2 are signals which have been input to the AD conversion circuit 108 via the amplifier 107 and subjected to AD conversion and are acquired by the Apos generating unit 301. The Apos generating unit 301 calculates a rotational position using an ArcTan (arctangent) operation. As a preprocess, adjustment of offsets and gains of the two input signals is performed. That is, adjustment for setting the offsets and the gains of the two input signals to be the same is performed. This adjustment is performed using results of detection of peak values and bottom values of two signals by rotating the motor 101 in OPEN driving. After the adjustment, a signal of a rotational angle (Apos) is generated by calculating a tangent value using two sine wave signals having a phase difference of 90 degrees and performing an arctangent operation. Rotational position information can be generated by calculating an integrated value of the value of the rotational angle. A relationship between sensor signals 1 and 2 and a rotational position signal will be described below with reference to the example illustrated in FIGS. 5A to 5C.

FIGS. 5A and 5B illustrate signals after detected rotational position signals have been adjusted. The signal illustrated in FIG. 5A is a sine wave signal and the signal illustrated in FIG. 5B is a cosine wave signal. FIG. 5C illustrates change of a count value of a detected position. The horizontal axis represents rotation of a rotor. This embodiment relates to two signals: sensor signal 1 and sensor signal 2, and it is assumed that a position can be detected with a position resolution of 1024 counts when a signal corresponding to one wavelength of a sine wave is output.

FIG. 4A illustrates an Apos. The horizontal axis of the graphs illustrated in FIGS. 4A to 4D represents rotation of a rotor. The value of the Apos is a count value which is proportional to rotation of the rotor.

The Bpos generating unit 302 illustrated in FIG. 3 generates a signal having an arbitrary offset value (referred to as a Bpos) for the Apos. The Bpos can be rewritten with an arbitrary value at an arbitrary time by the CPU 111, and a difference between the rewritten value and the Apos is recorded as an offset value at the time of rewriting. FIG. 4B illustrates a Bpos. The Bpos generating unit 302 generates a Bpos with a waveform to which the recorded offset value is normally added. The value of the Bpos is a signal value of a sawtooth wave which changes periodically with respect to a rotation between zero and an upper limit value (a maximum value).

Subsequently, the generated Bpos is supplied to the driving waveform phase determining unit (hereinafter referred to as a phase determining unit) 303. The phase determining unit 303 determines phase count information of driving waveforms which are finally applied to an A-phase coil 114 and a B-phase coil 115 and supplies PWM values corresponding to the phase count information to the PWM generator 112. The phase determining unit 303 switches between OPEN driving in which the phase count information is output in accordance with a command from an OPEN-driving count unit 304 and position-interlocking driving in which the phase count information based on the value of the Bpos is output. The position-interlocking driving is CLOSE driving. The OPEN driving and the position-interlocking driving are switched between by causing the CPU 111 to perform setting for the phase determining unit 303.

When the OPEN driving is performed, the CPU 111 supplies a command for a frequency of a driving waveform to the count unit 304 and sets an amplitude gain of the driving waveform in the phase determining unit 303. The phase determining unit 303 outputs a driving waveform with a desired frequency and a desired amplitude. When the position-interlocking driving is performed, the CPU 111 calculates a value by adding an offset to a lower 10-bit value of the Bpos. This offset includes STC_OFS which is set by a steady-state phase difference setting unit 305 and PHS_OFS which is set by a driving phase difference setting unit 306. This relationship is illustrated in the graphs of FIGS. 4C and 4D.

FIG. 4C illustrates a relationship between the lower 10-bit value and rotation. FIG. 4D illustrates a driving waveform after the offsets STC_OFS and PHS_OFS have been added. Both the offsets STC_OFS and PHS_OFS are added to the Bpos to give the offset values. STC_OFS serves to manage stable positions of a detected position count and a driving waveform count, and PHS_OFS serves to manage a phase difference for generating a torque. A value calculated by adding an offset is a count value of the driving waveform phase and an output value of a phase corresponding to the count value is selected as an output value of a driving waveform.

When the CPU 111 changes a set value for the driving phase difference (target phase difference) setting unit 306, the phase difference before the setting is not instantaneously switched to the target phase difference after the setting. The driving waveform generating circuit 110 has a gradual phase difference increase/decrease changing function of changing the phase difference to the set target phase difference and reflecting the target phase difference in the system over a predetermined time. ON/OFF of this function can be set by the CPU 111. The phase difference changing time in the gradual phase difference increase/decrease changing function is set by the driving phase difference changing time setting unit 307 illustrated in FIG. 3. A value which is set for the setting unit 307 by the CPU 111 is referred to as PS_TIME. As a value of PS_TIME, it is assumed that the changing time can be set in the order of ms (milliseconds). Setting of the value of PS_TIME will be described later in detail in a second embodiment.

The driving waveform generating circuit 110 determines a phase of a driving waveform and outputs a PWM command value corresponding to the driving waveform to the PWM generator 112. The PWM generator 112 outputs a PWM signal to the motor driver 113 in accordance with a PWM command value which is output from the driving waveform generating circuit 110.

A relationship between a sine wave position count value and an output PWM value (Duty % value) will be described below with reference to FIGS. 6A and 6B. The horizontal axis in FIGS. 6A and 6B represents a table number, corresponds to a phase of a voltage waveform, and has the same resolution as a driving waveform value illustrated in FIG. 4D.

In FIG. 6A, a case in which the horizontal axis is plus-counted, a B-phase driving voltage waveform advances 90 degrees with respect to an A-phase driving voltage waveform, and the motor 101 rotates in the CW direction is illustrated. On the other hand, in FIG. 6B, a case in which the horizontal axis is minus-counted, the A-phase driving voltage waveform advances 90 degrees with respect to the B-phase driving voltage waveform, and the motor 101 rotates in the CCW direction is illustrated. The Duty % value in the vertical axis increases or decreases depending on a gain setting value from the CPU 111. In this embodiment, it is assumed that an appropriate gain value without causing interference with a rotational motion of the motor 101 is set.

Figure 7:
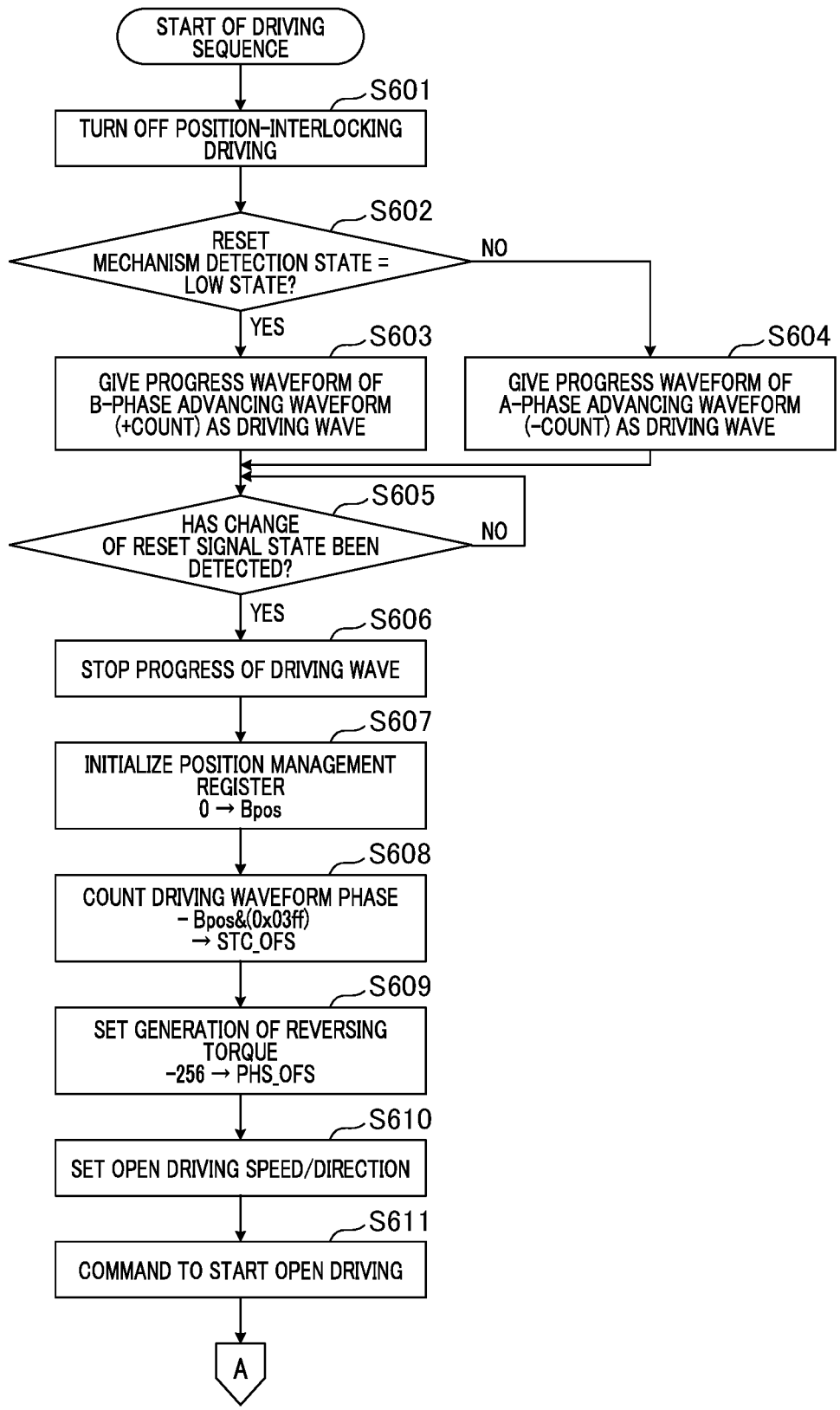
FIG. 7 is a flowchart illustrating a process flow according to a first embodiment of the present invention.
Figure 8:
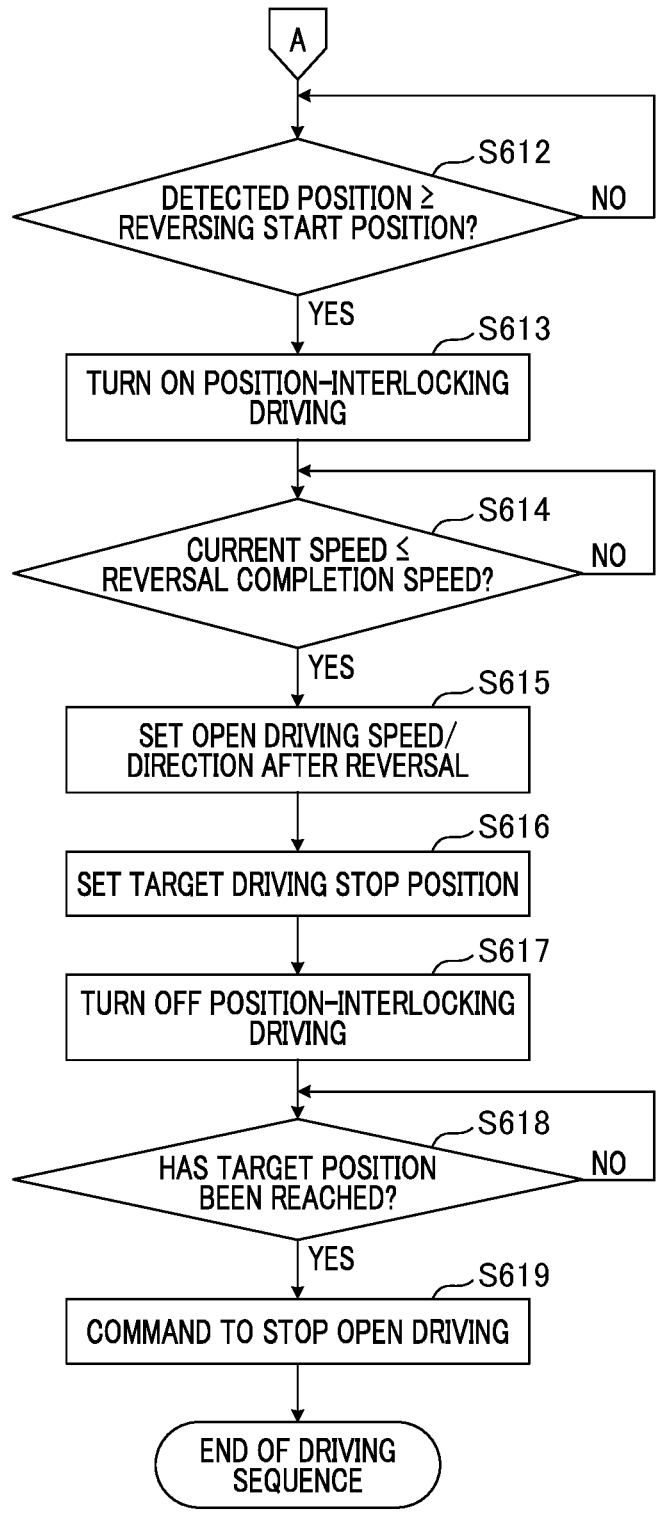
FIG. 8 is a flowchart illustrating a process flow which is performed subsequent to FIG. 7.

FIGS. 7 and 8 are flowcharts illustrating a process flow in this embodiment. The CPU 111 executes the following control in accordance with a predetermined program. First, in S601, a setting process of turning off position-interlocking driving is performed. That is, OPEN driving is set to function. In S602, the CPU 111 determines a detection state of a reset signal which is output from the reset mechanism 121. The reset signal is a binary signal that switches between High or Low when a detected member passes through a preset position with movement of the detected member attached to a screw mechanism of the rotor shaft 102. A side on which the motor driving device applies a B-phase advancing driving waveform to the motor 101 and the detected member advances in the CW rotation is a side on which the reset signal of a High level is output. A side on which the motor driving device applies an A-phase advancing driving waveform to the motor 101 and the detected member advances in the CCW rotation is a side on which the reset signal of a Low level is output. The determination process of S602 is performed to detect a position at which the reset signal changes and to determine an absolute position. When it is determined in S602 that the reset signal is at the Low level, the process flow transitions to S603. When it is determined in S602 that the reset signal is at the High level, the process flow transitions to S604.

In S603, the CPU 111 commands the count unit 304 for OPEN driving to generate a driving wave with a B-phase advancing waveform and executes control for rotating the motor 101. In S604, the CPU 111 commands the count unit 304 to generate a driving wave with an A-phase advancing waveform and executes control for rotating the motor 101. After S603 or S604 is performed, the process flow transitions to S605. In S605, the CPU 111 determines whether a state of the reset signal has changed. The CPU 111 monitors the reset signal, performs S606 when the reset signal has changed, and continues to monitor the reset signal to repeat the determination process of S605 when the reset signal has not changed.

In S606, the CPU 111 outputs a command for stopping progress of a driving waveform to the count unit 304. A stop position at this time serves as a reference position for position count. In S607, the CPU 111 initializes a Bpos register that manages a final position of a detected position and writes zero as the value of Bpos. In S608, the CPU 111 performs a process of writing a value, which is obtained by subtracting a lower 10-bit value of the Bpos from a phase count value of a driving waveform stored in the phase determining unit 303 in a state in which the rotor stops, as STC_OFS. The value of STC_OFS which is set via the steady-state phase difference setting unit 305 by the CPU 111 is a value for preventing deviation of an output phase of a driving waveform at the time at which the position-interlocking function is set to ON. At the time of S608, the rotor magnet 120 stops stably depending on a state in which a certain driving waveform phase is output as the result of an OPEN driving waveform. The driving waveform phase after the position-interlocking driving is set to ON is generated on the basis of the lower 10-bit value of the Bpos. Immediately after the position-interlocking driving has been turned on, the value of STC_OFS is added to the lower 10-bit value of the Bpos. Since the value after the addition is output as a phase count value of the driving waveform, it is guaranteed that the phase count value of the driving waveform does not change before and after the position-interlocking driving is turned on or off.

In S609, the CPU 111 performs setting for generating a reversing rotational torque in association with the position-interlocking function which is used for reversing driving. Specifically, a value of −256 corresponding to −90 degrees in the driving waveform phase is set for PHS_OFS. Subsequently, in S610, the CPU 111 sets a driving speed and a rotation direction of the OPEN driving. Here, a value of a low speed at which the rotor can rotate with a sufficient margin with which loss of synchronism does not occur in the OPEN driving is set and the rotation direction is set to the clockwise (CW) direction. Then, in S611, the CPU 111 outputs an OPEN driving start command to the driving waveform generating circuit 110. An OPEN driving operation of the count unit 304 is started, and the rotor magnet 120 starts rotation with progress of the driving waveform phase.

Then, in S612 illustrated in FIG. 8, the CPU 111 determines whether the detected rotational position of the rotor has reached a reversal start position or has exceeded the reversal start position. It is assumed that the reversal start position is set in advance. The process flow transitions to S613 when it is determined that the detected rotational position of the rotor has reached the reversal start position or has exceeded the reversal start position, and the determination process of S612 is repeatedly performed when it is determined that the detected rotational position of the rotor has not reached the reversal start position. Whether the detected rotational position has reached the reversal start position can be determined by causing an upper layer of the sequence in this embodiment to monitor a rotation and determining whether the rotation has reached a predetermined distance or the like. When it is determined that the rotation has reached the predetermined distance, a reversal command is transmitted from the upper layer and it may be determined that the detected rotational position has reached the reversal start position by receiving the reversal command. Instead of starting a reversing operation when the detected rotational position has reached a preset reversal start position, a reversal command may be transmitted on the basis of a user's operation and the reversing operation may be started by receiving the reversal command.

In S613, the CPU 111 sets the position-interlocking function to ON and controls an operation of generating a reversing rotational torque. A phenomenon which occurs in the motor 101 at this time will be described later with reference to FIGS. 9A to 9D and FIGS. 10A to 10F.

In S614, the CPU 111 monitors a current speed of the rotor and determines whether the current speed is equal to or less than a preset reversal completion speed (hereinafter referred to as v1). It is determined whether the current speed of the rotor is a value equal to or less than v1 (a greater value as an absolute value), and the determination process of S614 is continuously performed when the current speed is greater than v1. When the current speed is a value equal to or less than v1 (a greater value as an absolute value), the process flow transitions to S615.

In S615, the CPU 111 sets an OPEN driving speed and a rotation direction for switching to the OPEN driving. In this embodiment, a setting process of setting the setting speed to be the same as the reversal completion speed v1 and setting the rotation direction to the counterclockwise (CCW) direction is performed.

The CPU 111 sets a final target stop position in S616, sets the position-interlocking driving to OFF in S617, and executes control for switching to the OPEN driving. In S618, the CPU 111 determines whether the rotor rotational position has reached a target position. When it is determined that the rotor rotational position has not reached the target position, the determination process of S618 is repeatedly performed. When it is determined that the rotor rotational position has reached the target position, the process flow transitions to S619. In S619, the CPU 111 issues a driving stop command for the OPEN driving to stop the motor 101 and ends the driving sequence.

Figure 9:
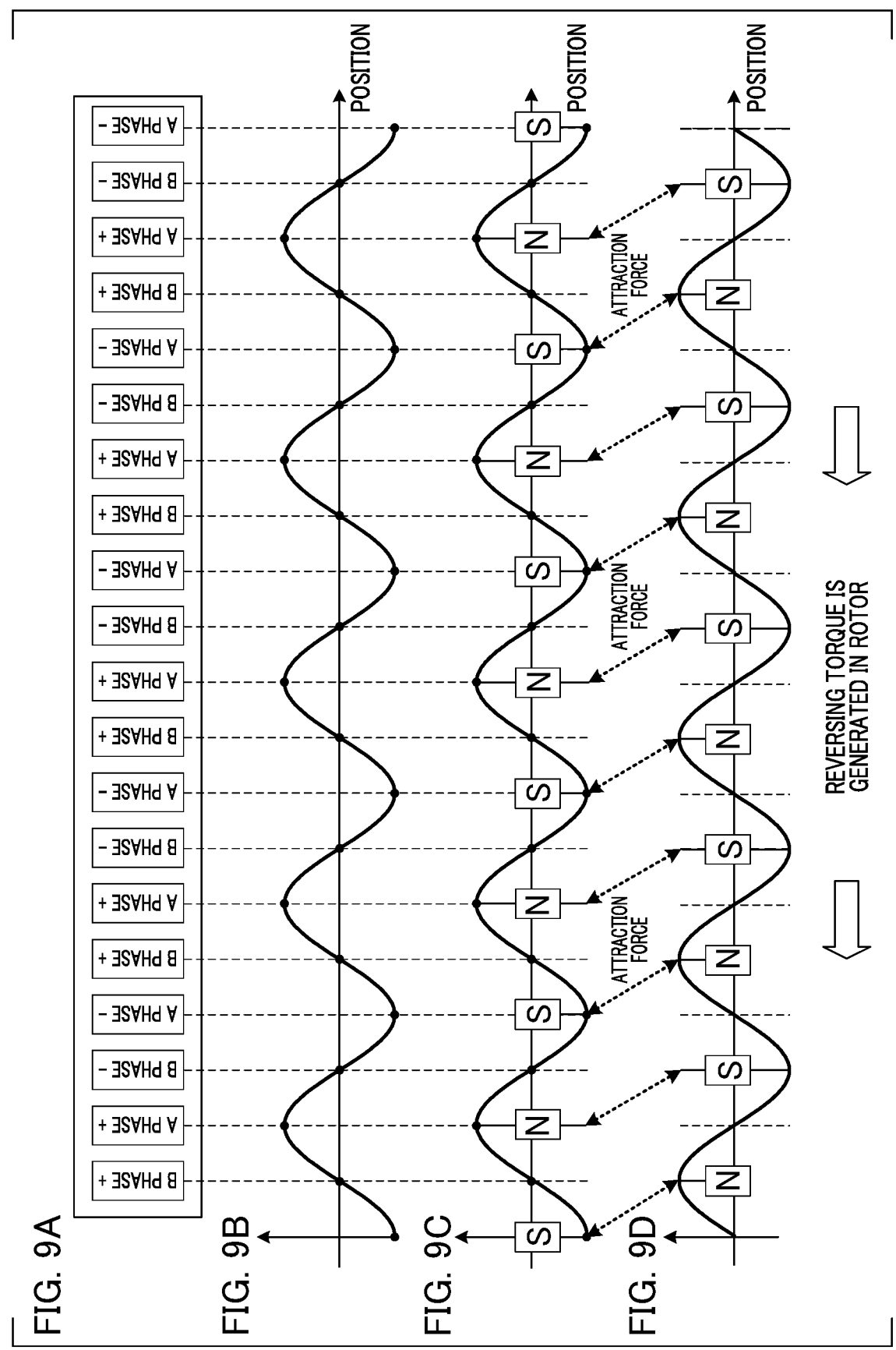
FIGS. 9A to 9D are diagrams illustrating a relationship between a rotor magnet phase and a driving waveform phase when a deceleration torque is generated.

FIGS. 9A to 9D are diagrams illustrating a phase relationship between the rotor magnet and the driving waveform when a deceleration torque is generated. FIG. 9A is a schematic diagram when the stator groups illustrated in FIG. 2C are arranged in a horizontal line. FIG. 9B is a diagram schematically illustrating voltages which are applied to the stator groups in the circumferential direction of the motor 101. FIG. 9C is a diagram illustrating intensity of a magnetic field which is generated by the stator groups with application of the voltages and which corresponds to a position in the circumferential direction. FIG. 9D is a diagram illustrating a magnetization phase of the rotor magnet 120 illustrated in FIG. 2C. In FIGS. 9B to 9D, the horizontal axis represents a position.

FIGS. 9A to 9D illustrate a state after the process of S613 has been performed. On the basis of relationship between the phases of the NS magnetic poles of the magnetic fields generated from the stator groups and the NS magnetic poles of the rotor magnet 120, an attraction force toward the left in FIGS. 9A to 9D, that is, a rotational torque in the CCW direction, is generated. The same operation will be described with reference to FIGS. 10A to 10F.

Figure 10:
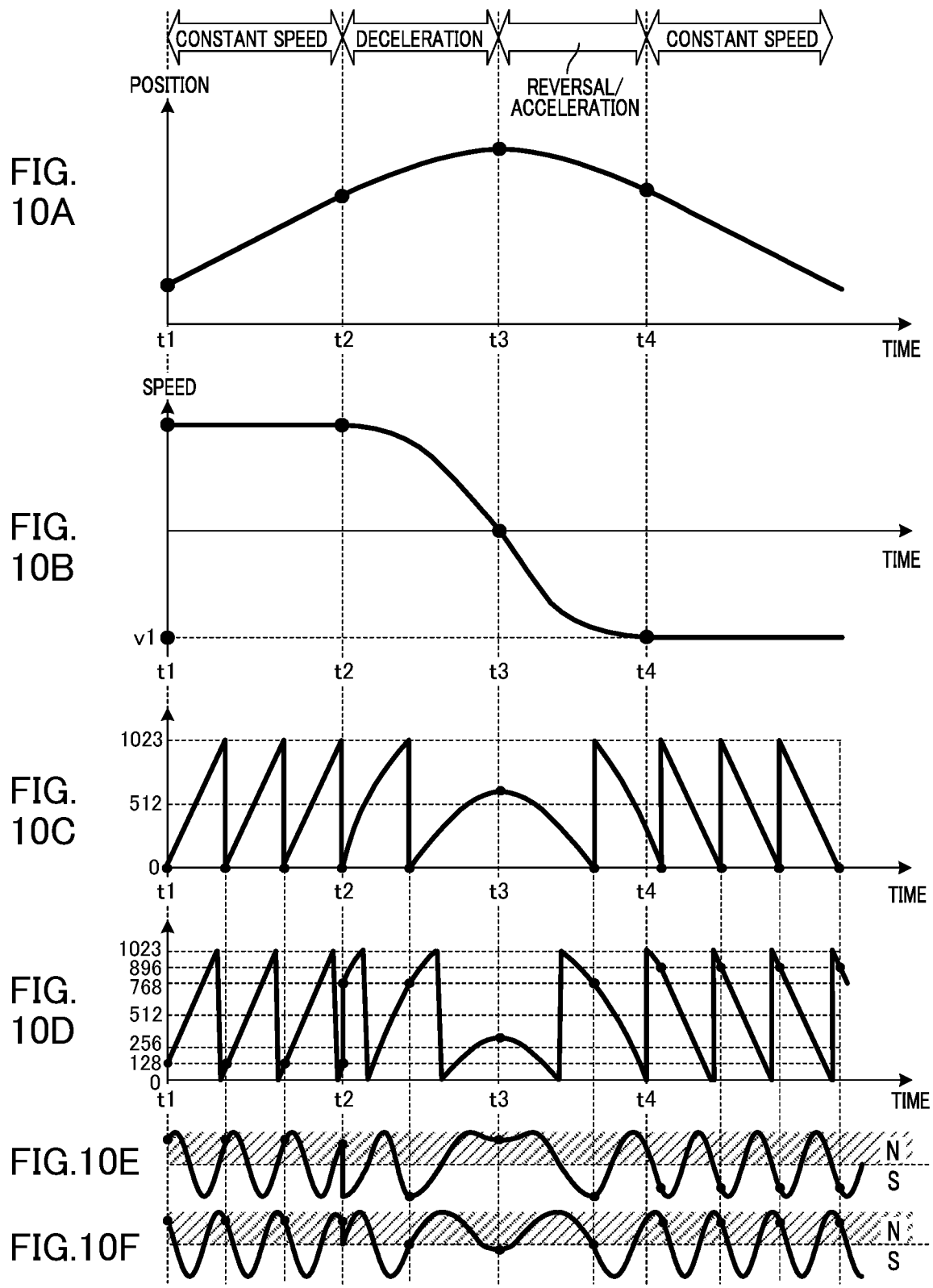
FIGS. 10A to 10F are diagrams illustrating reversing behavior in the first embodiment.

FIGS. 10A to 10F illustrate an example in which constant-speed control of the motor 101 is switched to deceleration control and constant-speed control is performed after the motor has been reversed and then accelerated. FIG. 10A is a graph illustrating Bpos behavior. FIG. 10B is a graph illustrating a speed which is obtained by differentiating a position with time. Here, v1 represents a reversal completion speed. FIG. 10C is a graph illustrating a lower 10-bit value of the Bpos. FIG. 10D is a graph illustrating behavior of the phase count value of a driving waveform. FIGS. 10E and 10F illustrate a waveform of a magnetic field which is generated in the stator A+ 116 and a waveform of a magnetic field which is generated in the stator B+ 118 on the basis of the phase count value of the driving waveform. In the drawings, the horizontal axis is a time axis, a period from time t1 to time t2 is a constant-speed period, and a period from time t2 to time t3 is a deceleration period. A period from time t3 to time t4 is a reversing and acceleration period, and a period after time t4 is a constant-speed period.

In the period between times t1 and t2 in FIGS. 10A to 10F, the rotor rotates at a constant speed in the CW direction with the OPEN driving. At this time, it can be seen from the result of comparison between the values in FIGS. 10C and 10D that there is a deviation of 128 counts which correspond to 45 degrees in terms of an electrical angle. This amount corresponds to a tracking delay amount indicating by what the rotor magnet 120 lags behind the phase of the driving waveform. That is, it represents that the tracking delay amount is 45 degrees with respect to the speed set in this embodiment and a load of a mechanism unit. Time t2 illustrated in FIGS. 10A to 10F is a time at which the process of S613 in FIG. 8 has been performed, and a process of outputting a driving waveform of phase count value which lags by 256 counts corresponding to 90 degrees in terms of an electrical angle with respect to the detected phase in FIG. 10C is performed at time t2. By this process, a torque state illustrated in FIGS. 9A to 9D is maintained and a reversing torque is continuously applied. As a result, deceleration is applied to the rotor from time t2 to time t3 in FIGS. 10A to 10F and the rotational speed decreases. However, since the torque in the CCW direction is maintained after the speed temporarily becomes zero at time t3, acceleration in the CCW direction starts.

At time t4 in FIGS. 10A to 10F, it is determined in S614 of FIG. 8 that reversal has been completed and the processes up to S617 are performed. After time t4, the OPEN driving is performed. At this time, it can be seen from the result of comparison between the values in FIGS. 10C and 10D that there is a deviation of 128 counts which correspond to 45 degrees in terms of an electrical angle. That is, it can be seen that the OPEN driving is performed in a stable state in which the tracking delay amount is 45 degrees.

In this embodiment, when the rotation direction is reversed during driving of stable constant-speed rotation in the open-loop control, the control is switched to control for synchronizing the phase of the detected rotational position and the phase of the driving waveform on the basis of the detected rotational position of the rotor, an efficient driving waveform is generated, and a reversing operation is performed. Accordingly, the control can be fast and smoothly switched to the open-loop control after the rotation direction has been reversed.

Second Embodiment

A second embodiment of the present invention will be described below. In this embodiment, a process when there is a vibration factor around a predetermined rotational speed in a driving system including a motor 101 and a mechanism unit connected to the motor and it is intended to more smoothly perform a reversing operation will be described. As an example of the mechanism unit connected to the motor 101, there is a driving mechanism unit that moves a movable lens (such as a focusing lens) in an imaging optical system in an application to an imaging device. The same elements in this embodiment as in the first embodiment will not be described and differences therebetween will be mainly described.

A specific process flow in this embodiment will be described below with reference to the flowcharts illustrated in FIGS. 11 and 12. The processes of S901 to S908 are the same as the processes of S601 to S608 in FIG. 7 and description thereof will be omitted. In S909, the CPU 111 sets a driving speed and a rotation direction of OPEN driving. Here, a value of a low speed at which the rotor can rotate with a sufficient margin with which loss of synchronism does not occur in the OPEN driving is set and the rotation direction is set to the clockwise (CW) direction. Then, in S910, the CPU 111 outputs an OPEN driving start command to the driving waveform generating circuit 110. An OPEN driving operation of the count unit 304 for the OPEN driving is started, and the rotor magnet 120 starts rotation with progress of the driving waveform phase.

Then, in S911, the CPU 111 determines whether the detected rotational position of the rotor has reached a reversal start position or has exceeded the reversal start position. The process flow transitions to S912 when it is determined that the detected rotational position of the rotor has reached the reversal start position or has exceeded the reversal start position. The determination process of S911 is repeatedly performed when it is determined that the detected rotational position of the rotor has not reached the reversal start position.

In S912, the CPU 111 detects an advancing state. Here, an advancing state refers to a difference of a relationship between the phase of a driving waveform and a detected phase of the rotor rotational position from the phase of a stable stop state of the rotor. In this embodiment, it is assumed that a state in which the phase of the driving waveform advances 45 degrees with respect to the phase of the detected rotational position of the rotor is detected as an advancing state. The state in which a phase angle (an advance angle) indicating the advancing state is 45 degrees is a state in which the count value of the driving waveform advances 128 counts with respect to the count value of the detected rotational position of the rotor.

In S913, the CPU 111 performs setting to generate the same rotational torque as in the current OPEN driving state when the position-interlocking function is started. Specifically, the setting unit 306 performs a setting process of setting a value 128 corresponding to 45 degrees in terms of a driving waveform phase as PHS_OFS.

Figure 12:
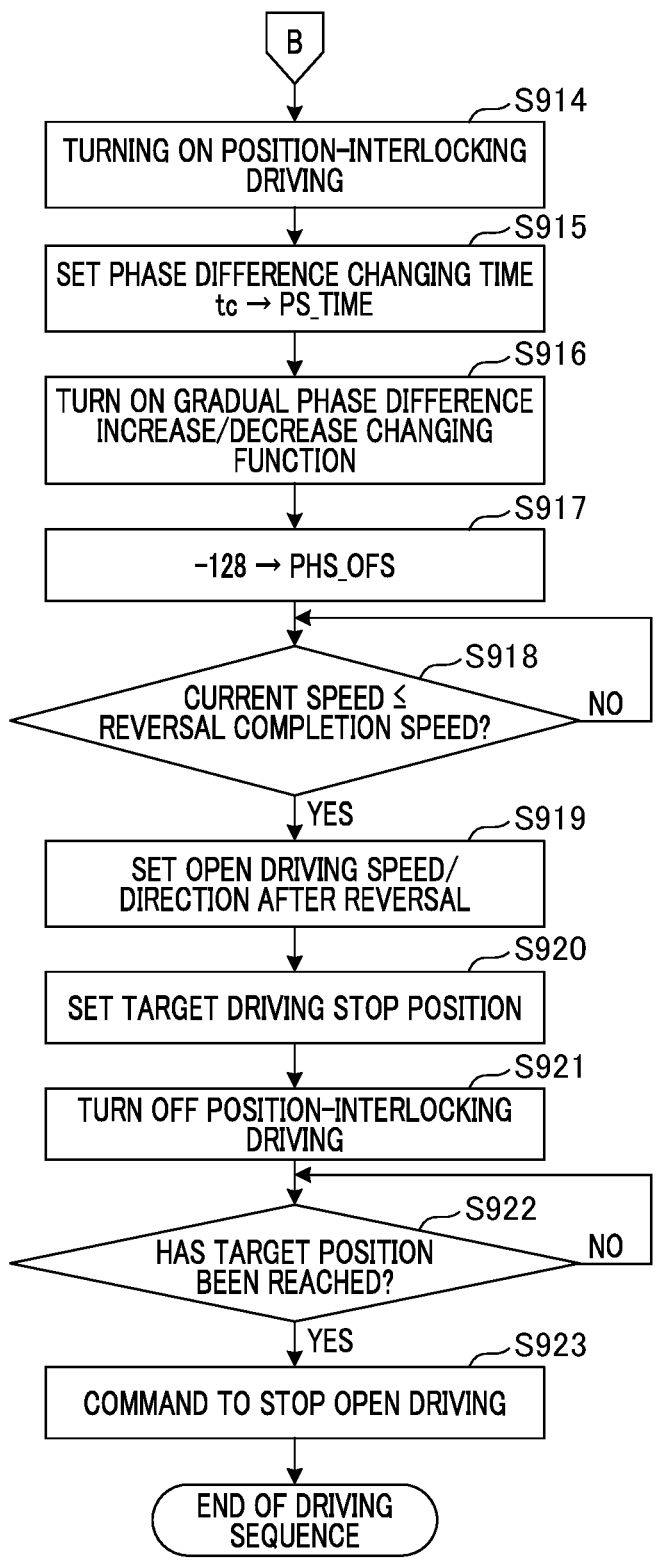
FIG. 12 is a flowchart illustrating a process flow which is performed subsequent to FIG. 11.

In S914 in FIG. 12, the CPU 111 sets the position-interlocking function to ON and controls an operation of generating a rotational torque. Subsequently, in S915, the CPU 111 sets a changing time of a phase difference using the setting unit 307 and writes a value of tc as PS_TIME. The method of determining tc will be described later.

In S916, the CPU 111 sets a gradual phase difference increase/decrease changing function to ON. In S917, the CPU 111 sets a value of −128 corresponding to −45 degrees in terms of the driving waveform phase as PHS_OFS which is used to generate a reversing torque. The method of determining the set value of −128 will be described later. By this setting, a torque in the CCW direction is generated in the motor 101. Movement corresponding to the processes of S911 to S917 will be described later with reference to FIGS. 13A to 13F and FIG. 14.

In S918, the CPU 111 monitors a current speed of the rotor and determines whether the current speed of the rotor is equal to or less than a preset reversal completion speed. The reversal completion speed is referred to as v1 (see FIG. 13B). When it is determined that the current speed of the rotor is a value greater than v1, the determination process of S918 is repeatedly performed. When it is determined that the current speed of the rotor is a value equal to or less than v1 (a greater value in terms of an absolute value), the process flow transitions to S919.

In S919, the CPU 111 sets an OPEN driving speed and a rotation direction for switching to the OPEN driving. In this embodiment, a setting process of setting the driving speed to be the same as the reversal completion speed v1 and setting the rotation direction to the CCW direction is performed. The CPU 111 sets a final target stop position in S920, sets the position-interlocking driving to OFF in S921, and then switches to the OPEN driving.

In S922, the CPU 111 determines whether the rotor rotational position has reached a target position. When it is determined that the rotor rotational position has not reached the target position, the determination process of S922 is repeatedly performed. When it is determined that the rotor rotational position has reached the target position, the process flow transitions to S923. In S923, the CPU 111 issues an operation stop command of the OPEN driving, stops the motor 101, and ends the driving sequence.

FIGS. 13A to 13F are diagrams illustrating the same quantities as in FIGS. 10A to 10F. In the time axis which is the horizontal axis, a period from time t5 to time t6 is a constant-speed period, and a period from time t6 to time t7 is a deceleration period. A period from time t7 to time t8 is a reversing and acceleration period, and a period after time t8 is a constant-speed period.

Figure 11:
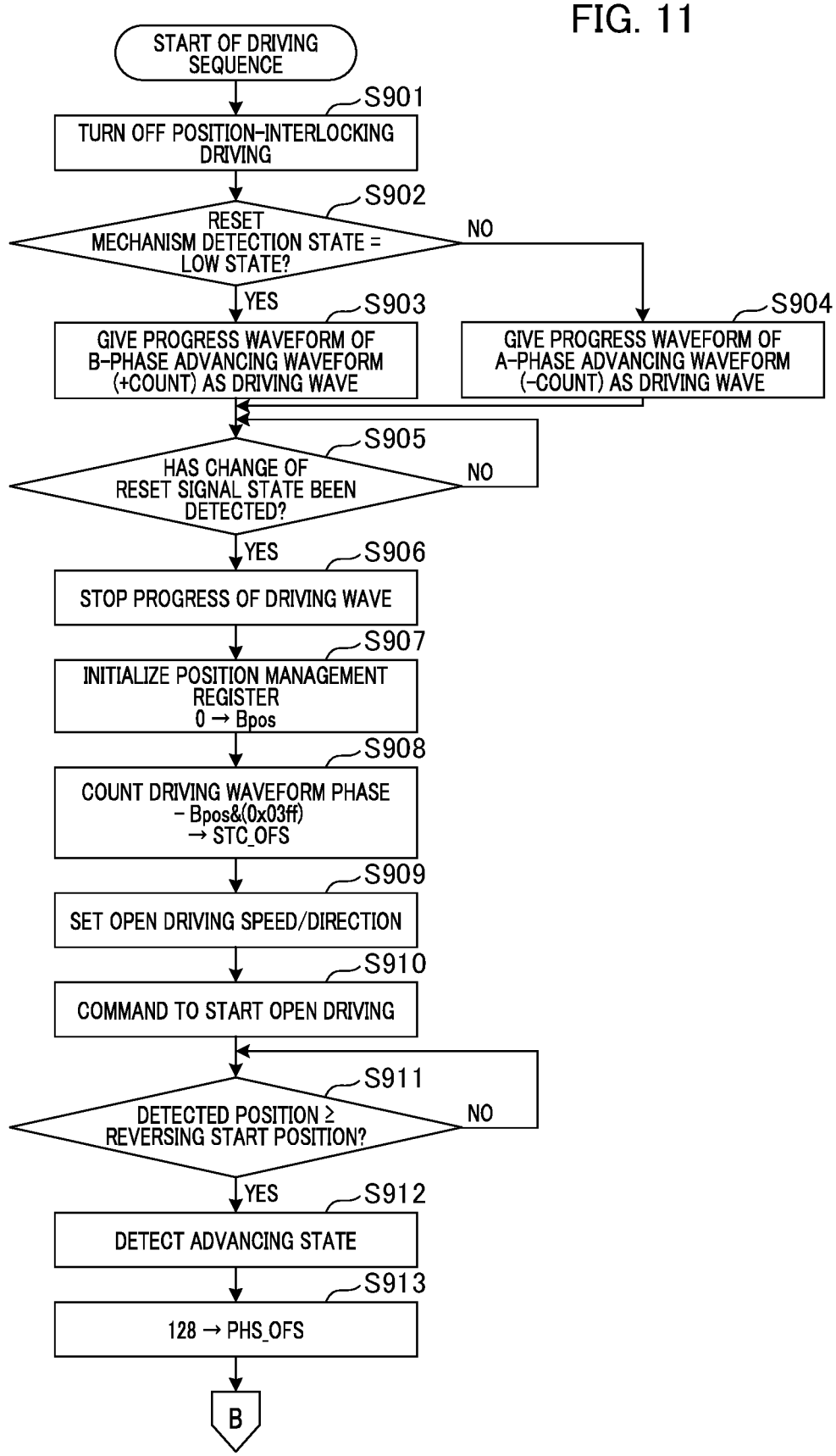
FIG. 11 is a flowchart illustrating a process flow according to a second embodiment of the present invention.

In the period from time t5 to time t6 in FIGS. 13A to 13F, rotational driving in the CW direction is performed in the OPEN driving, and the process of S912 illustrated in FIG. 11 is started at time t6. At time t6, the position-interlocking function is turned on and closed-loop control is started. Since the same phase difference setting as in the OPEN driving is performed immediately after the position-interlocking function has been turned on, behavior of a phase count value of a driving waveform in FIG. 13D is not discontinuous. Over a time tc from time t6, a difference value which is obtained by subtracting a lower 10-bit value of Bpos in FIG. 13C from the phase count value of the driving waveform in FIG. 13D changes smoothly form +128 counts to −128 counts. The phase difference of −128 counts is set to generate a torque in the CCW direction in the rotor, but an effect of preventing unnecessary vibration from being generated in a control target by the smooth change is achieved.

Since a torque in the CCW direction is applied to the rotor even after the time tc has elapsed from time t6, the rotor decelerates thereafter and transitions to reversing behavior at time t7. In a period from time t6 to time t7, the time length is longer than the period from time t2 to time t3 in FIGS. 10A to 10F described in the first embodiment in order to give priority to smooth reversing behavior. In this case, it is necessary to determine which of the control according to the first embodiment and the control according to this embodiment is to be used in consideration of features and vibration factors of the mechanism unit which is an application target. The value of −128 set for PHS_OFS for reversal and the value of tc will be described below.

Figure 14:
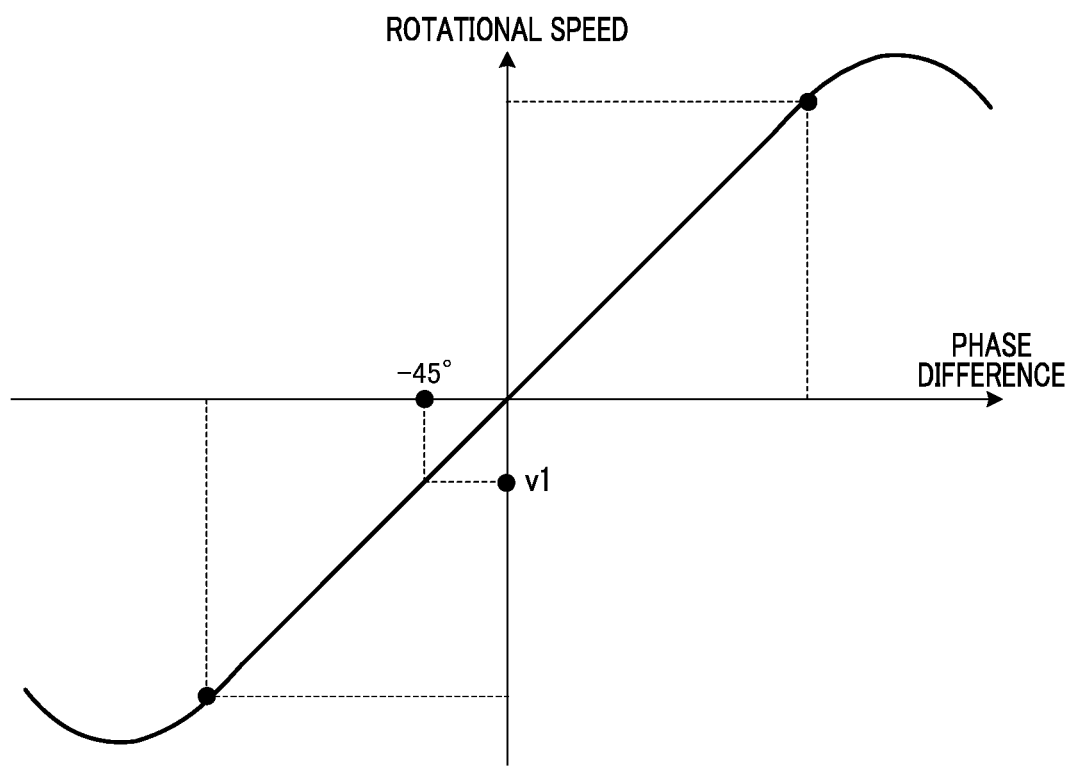
FIG. 14 is a diagram illustrating a relationship between a phase difference and a rotor rotation speed.

FIG. 14 is a graph illustrating a relationship between a phase difference and a rotational speed of the rotor in which the horizontal axis represents the phase difference and the vertical axis represents the rotational speed. The phase difference which is set as PHS_OFS is expressed in degrees. The rotational speed on the vertical axis represents a rotational speed which the rotor of the motor 101 reaches in a driving system employing the motor 101 after a sufficient acceleration time has been allowed for the set phase difference. It is assumed that the information illustrated in FIG. 14 is measured and specified in advance. In the rotational speed on the vertical axis, the plus side indicates the rotational speed in the CW direction and the minus side indicates the rotational speed in the CCW direction. Profile data indicating the relationship between the phase difference and the rotor rotational speed which is illustrated in FIG. 14 is stored in a memory in advance, and the setting unit 306 sets the value of PHS_OFS corresponding to the target phase difference for driving with reference to the data.

In this embodiment, it is assumed that the rotational speed after the rotation direction of the rotor has been reversed is v1. As can be seen from FIG. 14, the phase difference corresponding to the rotational speed v1 is −45 degrees. Accordingly, when setting of a phase difference of −45 degrees is performed on PHS_OFS after rotation of the rotor has been reversed, the rotational speed converges to v1. That is, the driving mode can be smoothly switched from the reversal to the OPEN driving at the rotational speed v1. In this sequence, −45 degrees which are a phase difference used for reversal and −128 which is a set count value are determined. As for the value of tc, appropriate time information for the rotational speed before reversal or a difference between the rotational speed before reversal and the target rotational speed after reversal is stored as a profile. The value of tc is determined on the basis of the profile stored in the memory in advance. Alternatively, as for the value of tc, appropriate time information for a phase angle (an advancing angle) indicating an advancing state before reversal or a difference between the phase angle indicating an advancing state before reversal and the phase angle indicating an advancing state after reversal is stored as a profile, and the value of tc is determined on the basis of the profile.

Figure 13:
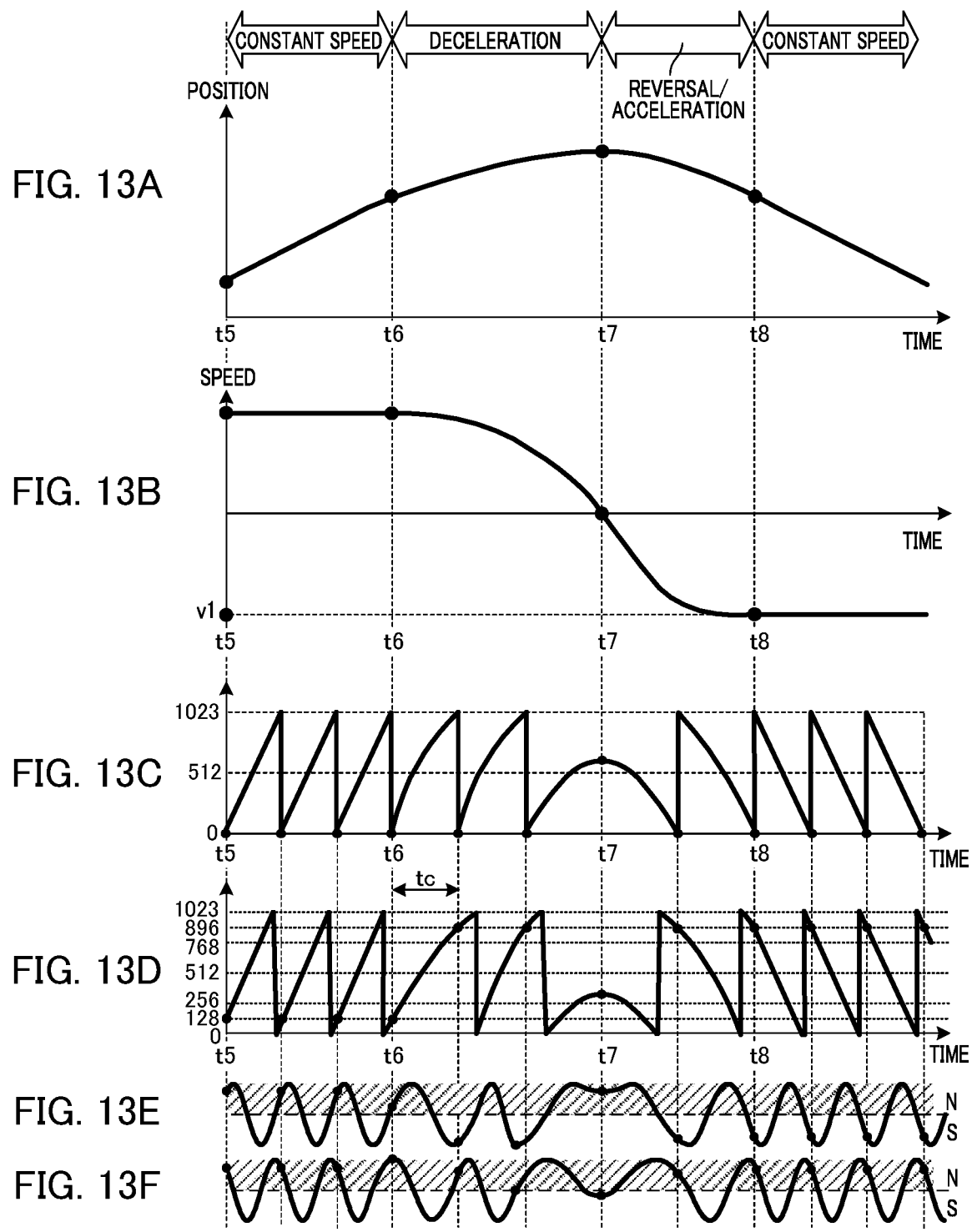
FIGS. 13A to 13F are diagrams illustrating reversing behavior in the second embodiment.

The time at which completion of reversal is determined in S918 in FIG. 12 and the processes up to S921 are performed is time t8 in FIG. 13. After time t8, the OPEN driving is performed. At this time, as can be seen from the result of comparison between FIGS. 13C and 13D, there is a deviation of 128 counts in count values which corresponds to 45 degrees in terms of an electrical angle. That is, it means that a tracking delay amount is 45 degrees and the OPEN driving is performed in a stable state. Since the phase difference in this state is the same as the phase difference in the closed-loop control which is stored at the time of deceleration and reversal, switching to the OPEN driving is smoothly performed at time t8.

In this embodiment, when the rotation direction is reversed during stable driving of constant-speed rotation in the open-loop control, it is possible to realize more smooth reversing behavior through there is a vibration factor around a predetermined rotational speed. Accordingly, it is possible to generate an efficient driving waveform on the basis of the detected rotational position of the rotor, to perform an operation of reversing the rotor, and to switch to the open-loop control again after reversal.

Figure 15A:
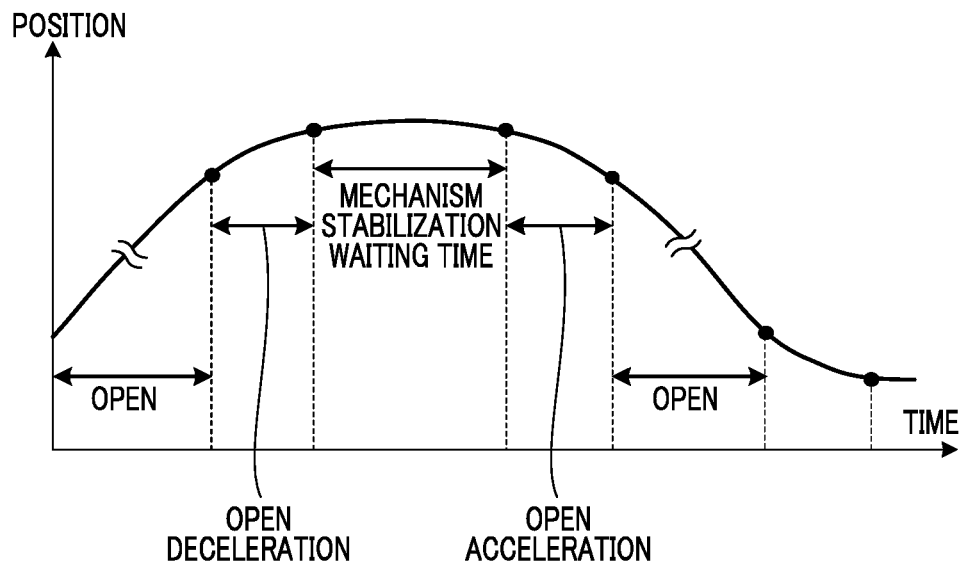
FIG. 15A is a diagram illustrating behavior in the related art and FIG. 15B is a diagram illustrating behavior in the embodiment.
Figure 15B:
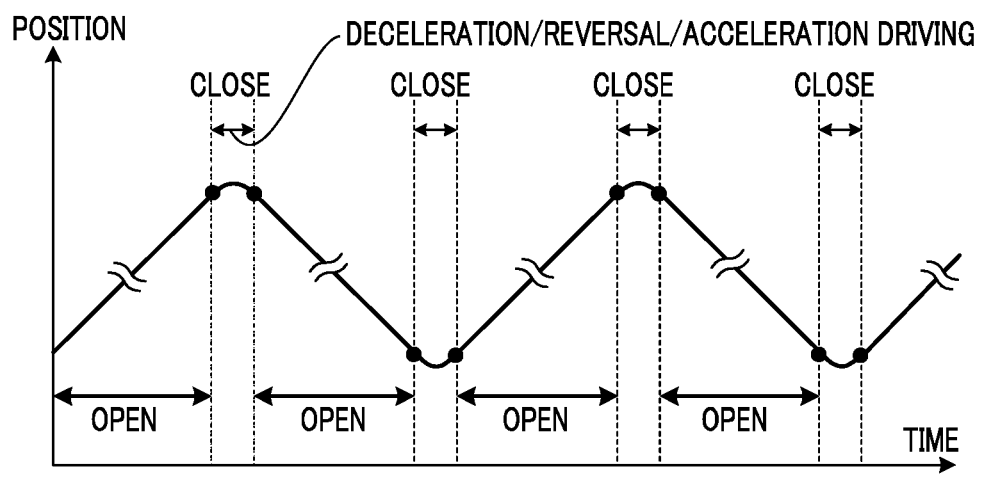

Behavior of a motor driving device according to the related art and behavior of the motor driving device according to this embodiment will be described below by comparison with reference to FIGS. 15A and 15B. In FIGS. 15A and 15B, the horizontal axis is a time axis and the vertical axis represents the rotational position of the rotor. In the drawings, "OPEN" indicates OPEN driving in the open-loop control and "CLOSE" indicates CLOSE driving in the closed-loop control.

FIG. 15A illustrates behavior when rotation of the rotor is reversed in the related art. In this case, it is necessary to provide a waiting time until the mechanism unit is stabilized after deceleration in the open-loop control has been performed. FIG. 15B illustrates behavior when rotation of the rotor is reversed in the embodiment of the present invention. The rotor is driven at a constant speed in the open-loop control. Then, the open-loop control is switched to the closed-loop control and the rotor is decelerated, reversed, and accelerated in the closed-loop control. It is possible to perform deceleration, reversal, and acceleration for a short time without providing a waiting time for stabilization. The control is switched to the open-loop control again after acceleration, and the rotor is driven at a constant speed. According to the embodiment of the present invention, it is possible to suppress loss of synchronism and to perform a stable reversing operation.

Third Embodiment

An embodiment in which a rotor is driven in a second driving mode and reversal is performed in the second driving mode will be described in a third embodiment of the present invention. This embodiment is different from the first embodiment in that a rotor is driven in the second driving mode (that is, CLOSE driving is performed) before a reversing position has been reached, but this embodiment is the same as the first embodiment in the other points and thus description thereof will be omitted.

Figure 16:
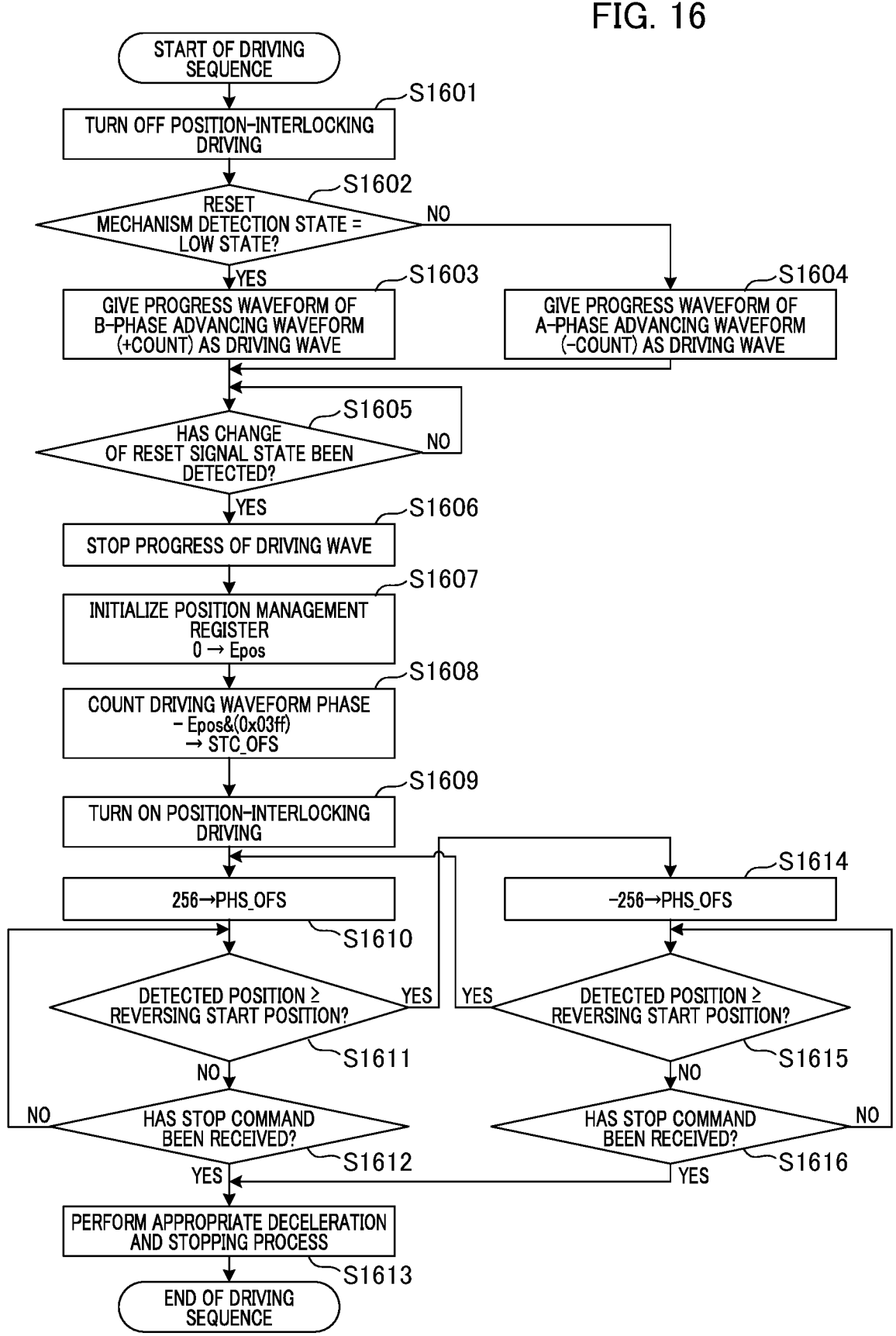
FIG. 16 is a flowchart illustrating a process flow according to a third embodiment.

FIG. 16 is a flowchart illustrating a process flow in this embodiment. The CPU 111 performs control illustrated in FIG. 16 in accordance with a predetermined program. When a driving sequence is started, the process of Step S1601 is performed. The processes of Steps S1601 to S1608 are the same as the processes of Steps S601 to S608 in the first embodiment and thus description thereof will be omitted.

In Step S1609, the CPU 111 sets position-interlocking driving to ON. At this time, it is assumed that zero is set as offset PHS_OFS. As described above in Step S608, an output phase of a driving waveform does not change immediately after the position-interlocking driving has been set to ON.

In Step S1610, an operation of generating a rotational torque in the CW direction is performed using an interlocking function. Specifically, PHS_OFS is set to 256 which is a value corresponding to 90 degrees in terms of a driving waveform phase. A phenomenon which occurs in the motor at this time will be described later with reference to FIGS. 17A to 19E.

In Step S1611, similarly to Step S612, the CPU 111 determines whether the detected rotational position of the rotor has reached a reversal start position or has exceeded the reversal start position. Similarly to Step S612, the determination may be performed by determining whether a reversal command based on a user's operation has been received. When it is determined in Step S1611 that the detected rotational position of the rotor has reached the reversal start position or has exceeded the reversal start position, the process flow transitions to Step S1612.

It is determined whether a stop command has been received in Step S1612, the process flow transitions to Step S1613 when the stop command has been received, and the process flow returns to Step S1611 when the stop command has not been received. The stop command in Step S1612 is transmitted from an upper layer when the upper layer determines that a predetermined number of reversing operations have ended or stop is necessary due to other factors.

In Step S1613, a deceleration and stopping process is performed to stop the motor and a series of processes of the driving sequence end. A specific method of the deceleration and stopping process is not particularly limited and, for example, when the value of PHS_OFS is changed to a value with which a braking torque is applied and deceleration is performed, the value of PHS_OFS is set to 0 such that a rotational torque is not generated. Finally, by turning off the position-interlocking driving and fixing the phase of the driving waveform, the deceleration and stopping process can be performed.

On the other hand, when it is determined in Step S1611 that the detected rotational position has not reached the reversal start position, the process flow transitions to Step S1614 and an operation of generating a rotational torque in a reverse direction is performed using the interlocking function. Specifically, PHS_OFS is set to 256 which is a value corresponding to −90 degrees in terms of a driving waveform phase. In this way, it is determined whether a reversal command has been received during a rotational motion in the CW direction, and a rotational torque in the CCW direction is generated immediately after it is determined that a reversal command has been received. Accordingly, the rotation can transition to a rotational motion in the reverse direction without performing a stopping operation from the rotational motion started in Step S1610.

After Step S1614 has been performed, the process flow transitions to Step S1615. In Step S1615, similarly to Step s1611, it is determined whether the detected rotational position has reached the reversal start position, the process flow transitions to Step S1616 when it is determined that the detected rotational position has reached the reversal start position, and the process flow transitions to Step S1610 when it is determined that the detected rotational position has not reached the reversal start position. In Step S1610, similarly to transition from Step S1611 to Step S1614, the rotation transitions a rotational motion in the CCW direction to a rotational motion in the CW direction without performing a stopping operation. In this way, by determining whether the detected rotational position of the rotor has reached the reversal start position in Steps S1611 and S1615, the motor 101 can fast perform a reversing operation without performing a stopping operation in the meanwhile. This is because since the motor driving device according to this embodiment can detect a rotational position with position detection accuracy of about several tens kHz to 100 kHz, the driving waveform phase at which a reversing torque is generated can be continuously applied to the rotor magnet on the basis of the detected rotational position.

On the other hand, when the process flow transitions from Step S1615 to Step S1616, similarly to Step S1612, it is determined whether a stopping command has been received. The stopping command in Step S1616 is the same as the stopping command in Step S1612. The process flow transitions to Step S1613 when it is determined in Step S1616 that a stopping command has been received, and the process flow returns to Step S1615 when a stopping command has not been received.

Figure 17:
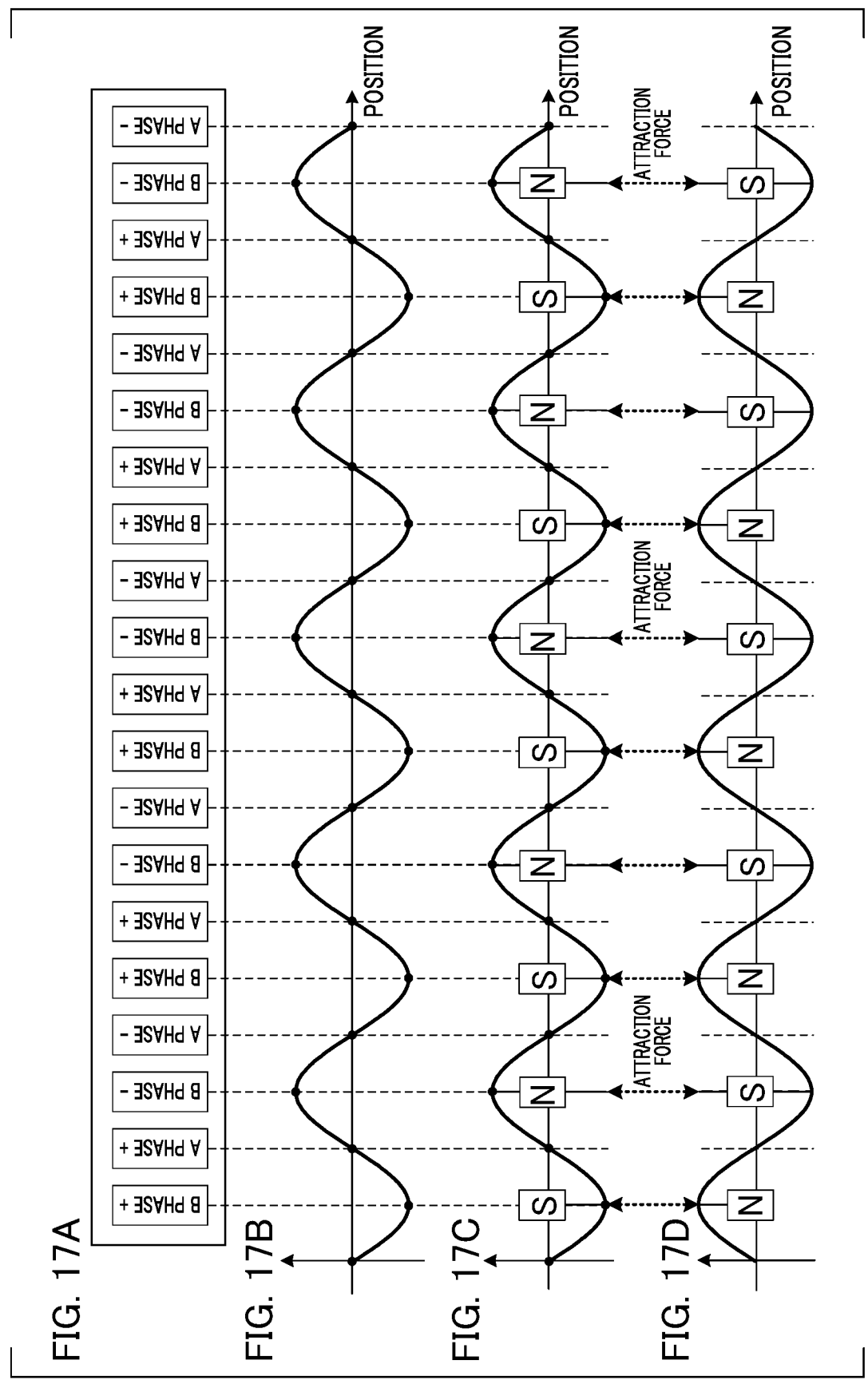
FIGS. 17A to 17D are diagrams illustrating a state in which a rotor magnet phase and a driving waveform phase have a stable stop relationship.
Figure 18:
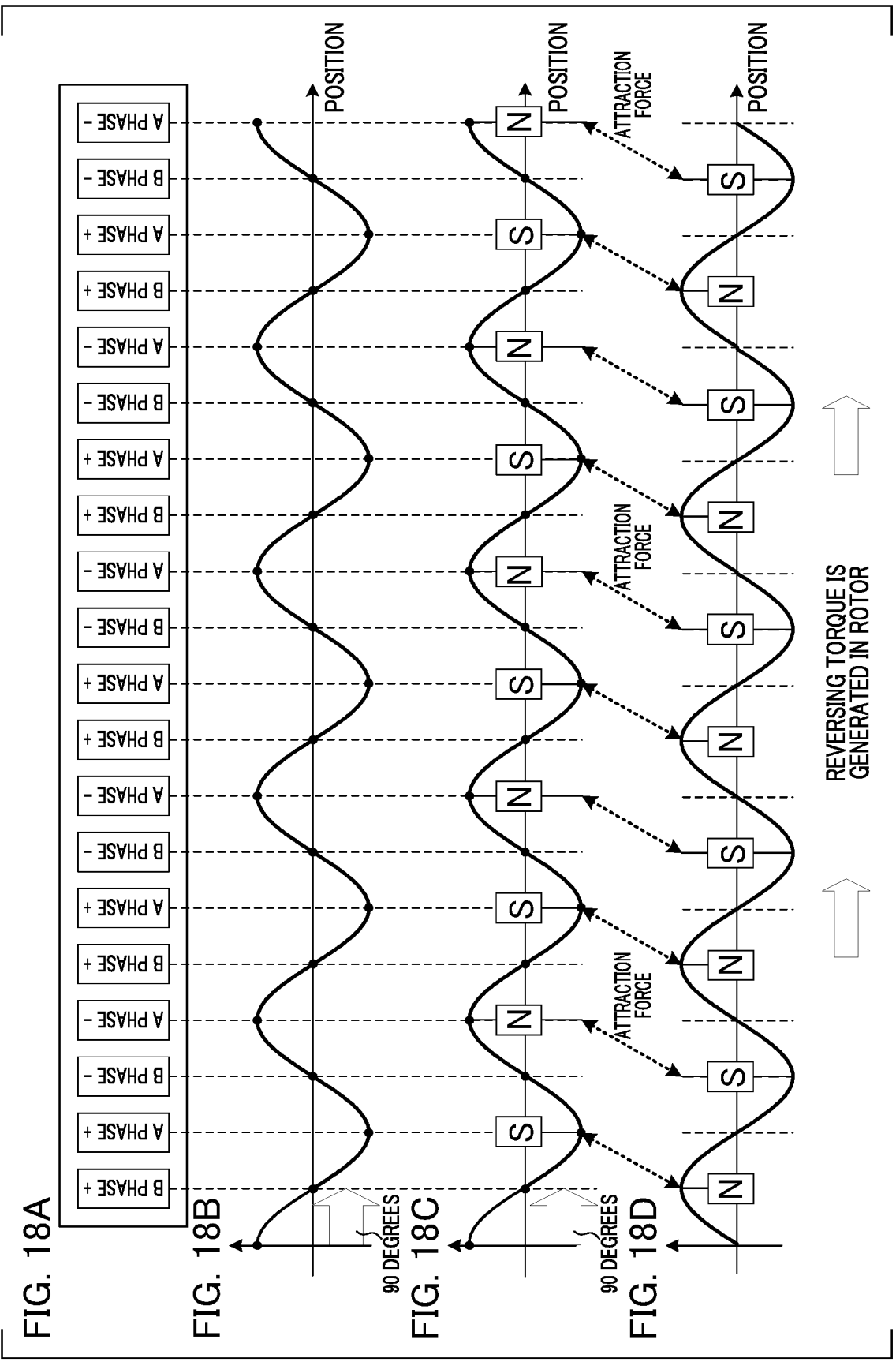
FIGS. 18A to 18D are diagrams illustrating a state in which a rotor magnet phase and a driving waveform phase have a relationship in which a forward torque is generated.
Figure 19:
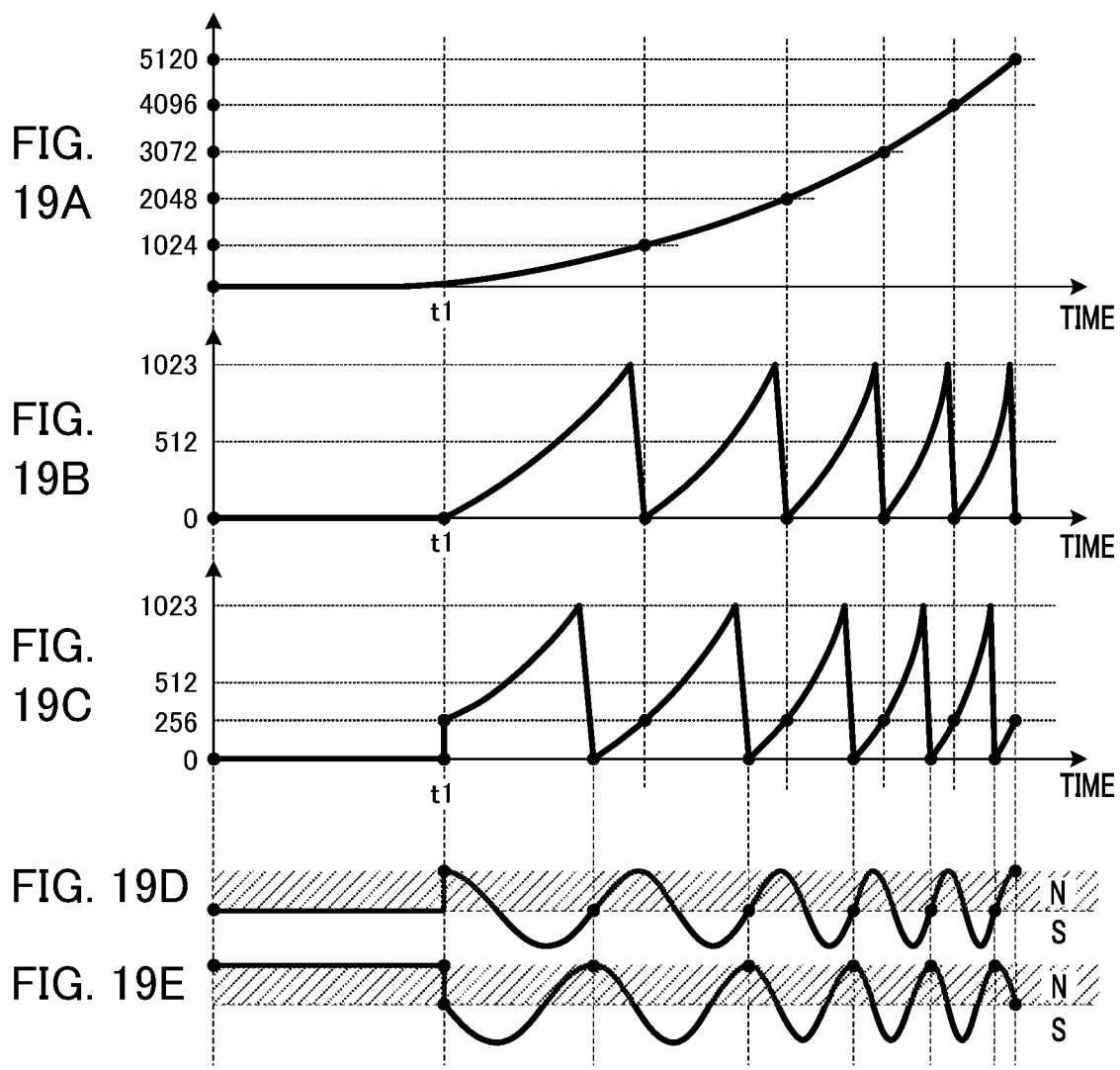
FIGS. 19A to 19E are diagrams illustrating behavior at the time of acceleration of a motor according to a third embodiment.

The process of Step S1610 in FIG. 16 will be specifically described below with reference to FIGS. 17A to 19E. FIGS. 17A to 17D illustrate a relationship between the rotor magnet phase and the driving waveform phase in Step S1609, where the relationship between the phases of the NS magnetic poles of the magnetic fields generated from the stator groups and the NS magnetic poles of the rotor magnet 120 is a relationship in which the rotor stops stably. FIG. 17A is a schematic diagram illustrating an arrangement of the stator groups illustrated in FIG. 2C in which the stators are arranged in a horizontal line. FIG. 17B is a diagram schematically illustrating voltages which are applied to the stator groups in the circumferential direction of the motor. FIG. 17C is a diagram illustrating intensity of a magnetic field which is generated by the stator groups with application of the voltages and which corresponds to a position in the circumferential direction. FIG. 17D is a diagram illustrating a magnetization phase of the rotor magnet 120 illustrated in FIG. 2C.

On the other hand, after PHS_OFS is set to 256 in Step S1610, the relationship between the rotor magnetic phase and the driving waveform phase changes to the relationship illustrated in FIGS. 18A to 18D. FIGS. 18A to 18D correspond to FIGS. 17A to 17D. In the state illustrated in FIGS. 18A to 18D, the magnetic field which is generated by the stator groups advances 90 degrees with respect to the state illustrated in FIGS. 17A to 17D. Accordingly, as illustrated in FIG. 18D, an attraction force for attracting the rotor magnet 120 toward the right, that is, a rotational torque in the CW direction, is generated.

FIGS. 19A to 19E are graphs illustrating behavior of a motor when the rotor magnet phase and the driving waveform phase have changed from the state illustrated in FIGS. 17A to 17D (a stable stopping state) to the state illustrated in FIGS. 18A to 18D (in a CW torque generation state), where the horizontal axis of FIGS. 19A to 19E is a time axis. FIG. 19A illustrates a temporal change of Bpos and the vertical axis represents a position of the rotor. FIG. 19B is a graph illustrating a temporal change of a lower 10-bit value of Bpos and FIG. 19C is a graph illustrating a temporal change of a driving waveform phase count value. FIGS. 19D and 19E illustrate a temporal change of the driving waveform magnetic field which is generated in the stator A+ 116 and a temporal change of the driving waveform magnetic field which is generated in the stator B+ 118 on the basis of the driving waveform phase count value, respectively. Time t1 is a time at which 256 is set as the value of PHS_OFS in Step S1610 in FIG. 16.

As described above with reference to FIGS. 17A to 17D and FIGS. 18A to 18D, when PHS_OFS is set to 256 at time t1 in FIGS. 19A to 19E, a difference of 256 is generated between the lower 10-bit value of Bpos in FIG. 19B and the driving waveform phase count value in FIG. 19C. Accordingly, the driving waveform phase advances 90 degrees with respect to the rotational phase of the rotor and a torque in the CW rotation direction is generated. When the motor rotates, Bpos which is the detected position advances and thus the driving waveform phase count value also advances. By this loop process, a phase difference between two waveforms illustrated in FIGS. 18B and 18C is normally maintained, and a rotational torque is continuously applied. As a result, as illustrated in FIG. 19A, rotation of the rotor is accelerated and the speed of the motor increases. When PHS_OFS is set to 256 and generation of a torque in the CW rotation direction is started, the determination processes of Steps S1611 and S1612 are periodically performed.

FIGS. 20A to 20F are graphs illustrating behavior after acceleration of the motor illustrated in FIGS. 19A to 19E, where the horizontal axis in FIGS. 20A to 20F is a time axis. FIGS. 20A to 20F illustrate behavior when sufficient acceleration in the CW direction has been performed in a period from Step S1610 to a time at which it is determined in Step S1611 that the detected rotational position has reached the reversal start position.

Figure 20:
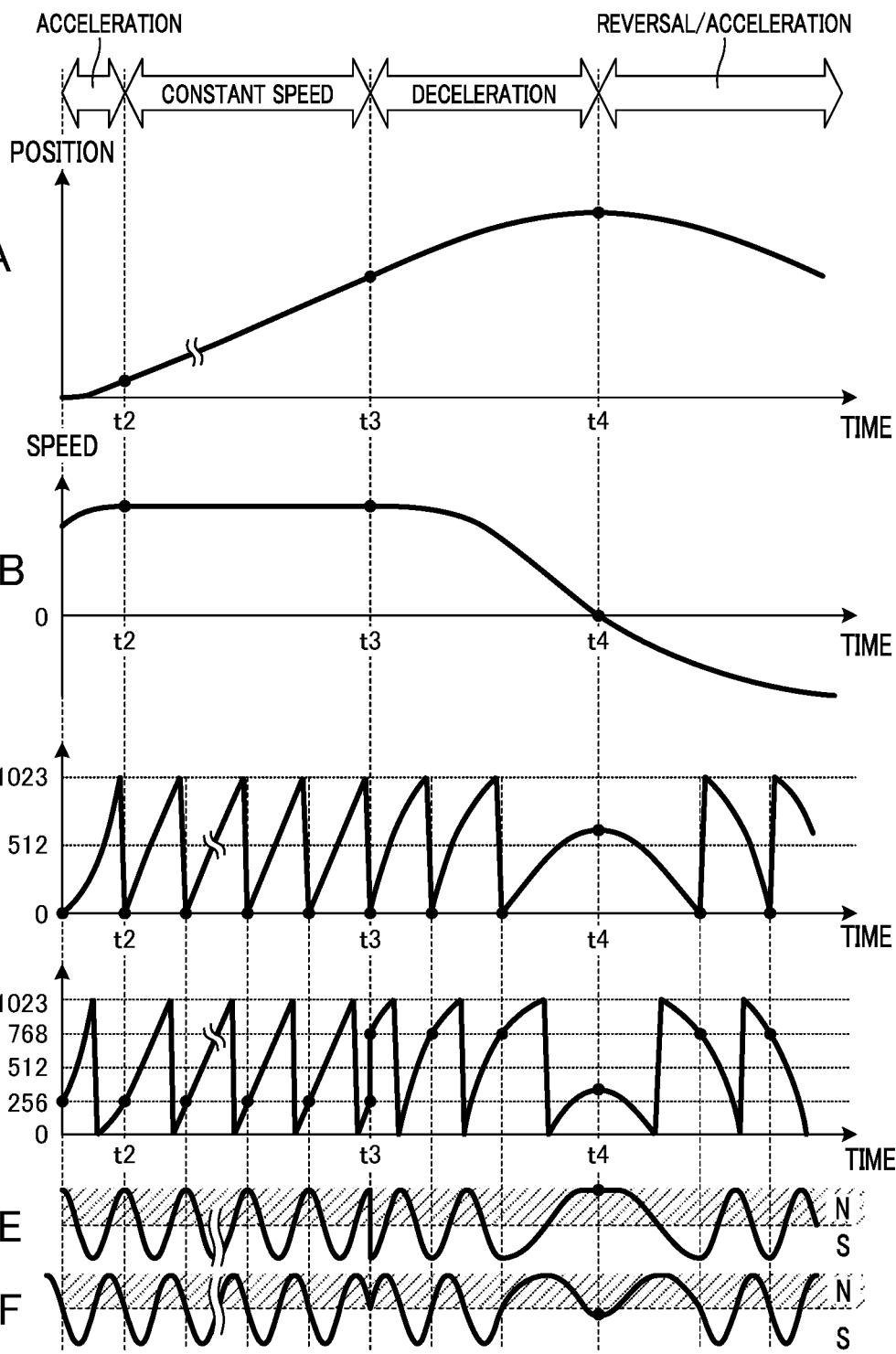
FIGS. 20A to 20F are diagrams illustrating behavior when the motor rotates at a steady-state speed and when the motor decelerates and stops according to the third embodiment.

FIG. 20A is a graph illustrating a temporal change of Bpos, where the vertical axis represents a position. FIG. 20B is a graph illustrating a rotational speed (a rotation speed) of the motor, where the vertical axis represents the rotational speed. FIG. 20C is a graph illustrating a temporal change of the lower 10-bit value of Bpos, and FIG. 20D is a graph illustrating a temporal change of the driving waveform phase count value. FIGS. 20E and 20F illustrate a temporal change of the driving waveform magnetic field which is generated in the stator A+ 116 and a temporal change of the driving waveform magnetic field which is generated in the stator B+ 118 on the basis of the driving waveform phase count value, respectively.

It is assumed that acceleration is continuously performed after the acceleration sequence illustrated in FIGS. 19A to 19E and then the sequence illustrated in FIGS. 20A to 20F is performed. Acceleration is continuously performed until time t2 in FIGS. 20A to 20F and the motor is in a constant-speed state in the period from time t2 to time t3. This is because since the generated torque attenuates due to a frequency characteristic delay of a coil when a voltage is converted into a current with an increase in the rotation speed or an influence of a counter electromotive force increases, the generated torque, the counter electromotive force, and the mechanical load are balanced at a certain rotation speed.

Time t3 is assumed to be a timing at which it is determined in Step S1611 that the detected rotational position has not reached the reversal start position and the process flow transitions to Step S1614. After PHS_OFS has been set to −256 at time t3, the relationship between the magnetic field of the stator groups and the magnetization phase of the rotor magnet 120 changes from the relationship illustrated in FIGS. 18C and 18D to the relationship illustrated in FIGS. 9C and 9D described above in the first embodiment.

The relationship between the rotor magnet phase and the driving waveform phase after PHS_OFS has been set to −256 in Step S1614 in FIG. 16 is the same as the relationship between the rotor magnet phase and the driving waveform phase after the process of Step S613 described above with reference to FIGS. 9A to 9D has been performed. In the state illustrated in FIGS. 9A to 9D, the magnetic field which is generated in the stator group lags 90 degrees with respect to the state illustrated in FIGS. 17A to 17D, and thus an attraction force toward the left, that is, a rotational torque in the CCW direction, is generated in the rotor magnet 120 illustrated in FIG. 9D.

The same motion will be described with reference to FIGS. 20A to 20F. A value which is obtained by adding PHS_OFS to the lower 10-bit value of Bpos in FIG. 20C is the driving waveform phase count value illustrated in FIG. 20D. A state in which a torque in the CW rotation direction is generated in FIG. 18A to 18D (PHS_OFS=256) is maintained until time t3, and a state in which a torque in the CCW rotation direction is generated in FIGS. 9A to 9D (PHS_OFS=−256) is maintained after time t3. On the other hand, the motor 101 can apply a rotational torque in the CCW direction while rotating in the CW direction and the rotational speed decreases after time t3. Then, at time t4, the rotation direction of the motor changes from the CW direction to the CCW direction and a reversing operation is started.

Time t4 is a peak of the graph illustrating a position in FIG. 20A and is a time point at which a positive value changes to a negative value in the graph illustrating the rotational speed in FIG. 20B. The waveforms of the driving waveform magnetic field which is generated in the stator A+ 116 and the driving waveform magnetic field which is generated in the stator B+ 118 in FIGS. 20E and 20F smoothly exchange a phase precedence relationship with each other. No particular control is performed at a time at which the reversing rotational motion is performed, and the torque in the CCW direction applied to the motor 101 serves as a braking operation in the CW direction and serves as an acceleration torque in the CCW direction at time t4. After time t4, an accelerating operation is performed until the determination result of Step S1615 or S1616 is YES, and the acceleration torque and the counter electromotive force generated in the motor are balanced into a constant-speed state in the same way as at the time of rotation in the CW direction.

Fourth Embodiment

A fourth embodiment is different from the third embodiment in the configuration of the position ENC circuit 109 and is common to the third embodiment in the other configurations and thus the description of common configurations will be omitted.

Figure 21:
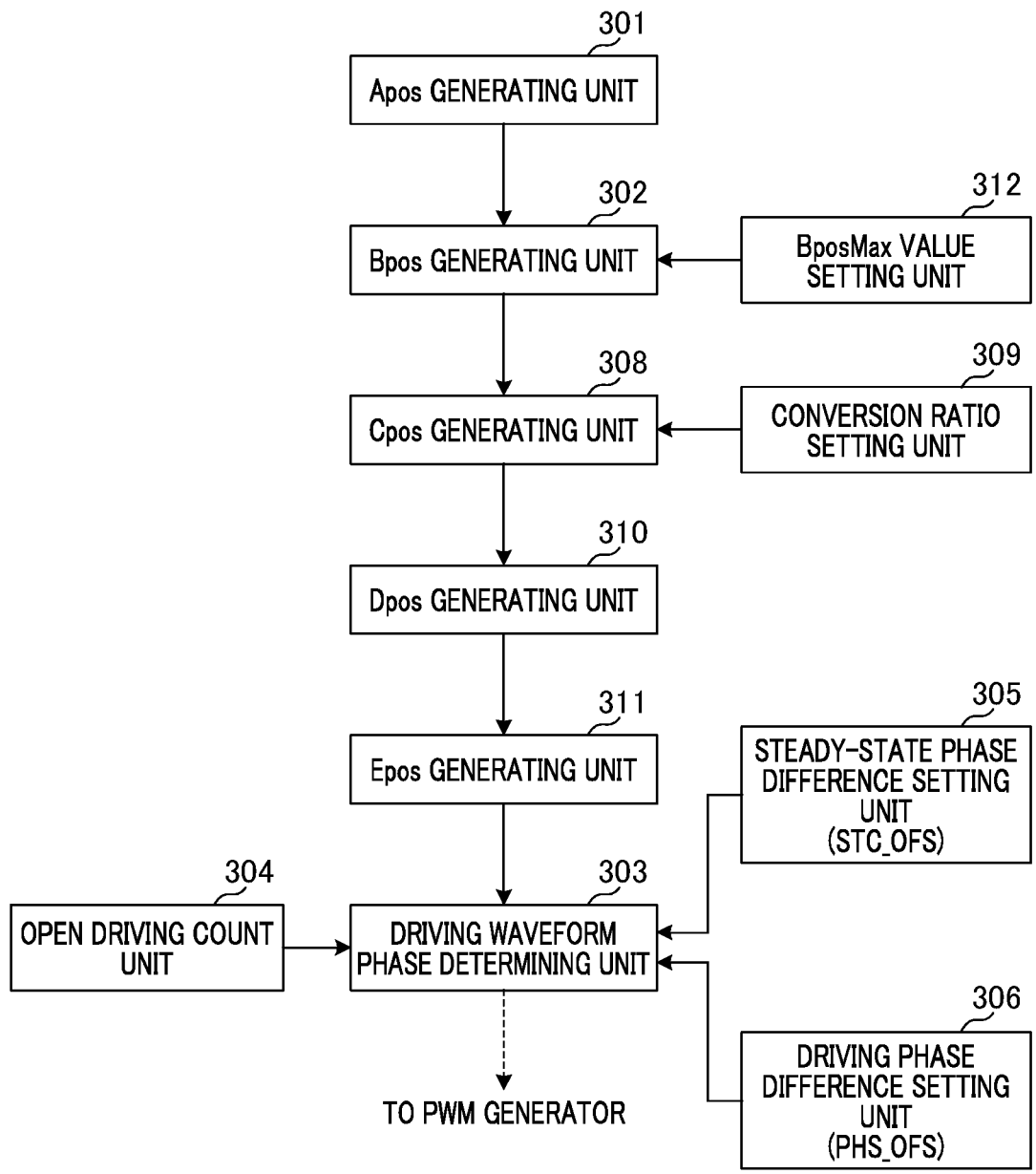
FIG. 21 is a block diagram illustrating a position ENC circuit and a driving waveform generating circuit according to a fourth embodiment.

FIG. 21 is a block diagram illustrating processes which are performed by the position ENC circuit 109 and the driving waveform generating circuit 110 in detail. An Apos generating unit 301, a Bpos generating unit 302, a Cpos generating unit 308, a conversion ratio setting unit 309, a Dpos generating unit 310, an Epos generating unit 311, and a BposMax value setting unit 312 correspond to the position ENC circuit 109. A driving waveform phase determining unit 303, an OPEN driving count unit 304, a steady-state phase difference setting unit 305, and a driving phase difference setting unit 306 correspond to the driving waveform generating circuit 110. The Apos generating unit 301, the driving waveform phase determining unit 303, the OPEN driving count unit 304, the steady-state phase difference setting unit 305, and the driving phase difference setting unit 306 are the same as in the first embodiment and description thereof will be omitted.

The Bpos generating unit 302 generates Bpos by converting the value of Apos into a position signal with an upper limit value, which is set in advance using the BposMax value setting unit 312 by the CPU 111, as a maximum value (a BposMax value). The BposMax value which is set by the BposMax value setting unit 312 is set to a value corresponding to a position count which is detected by the Apos generating unit 301 when the motor has rotated accurately by one turn.

Figure 22:
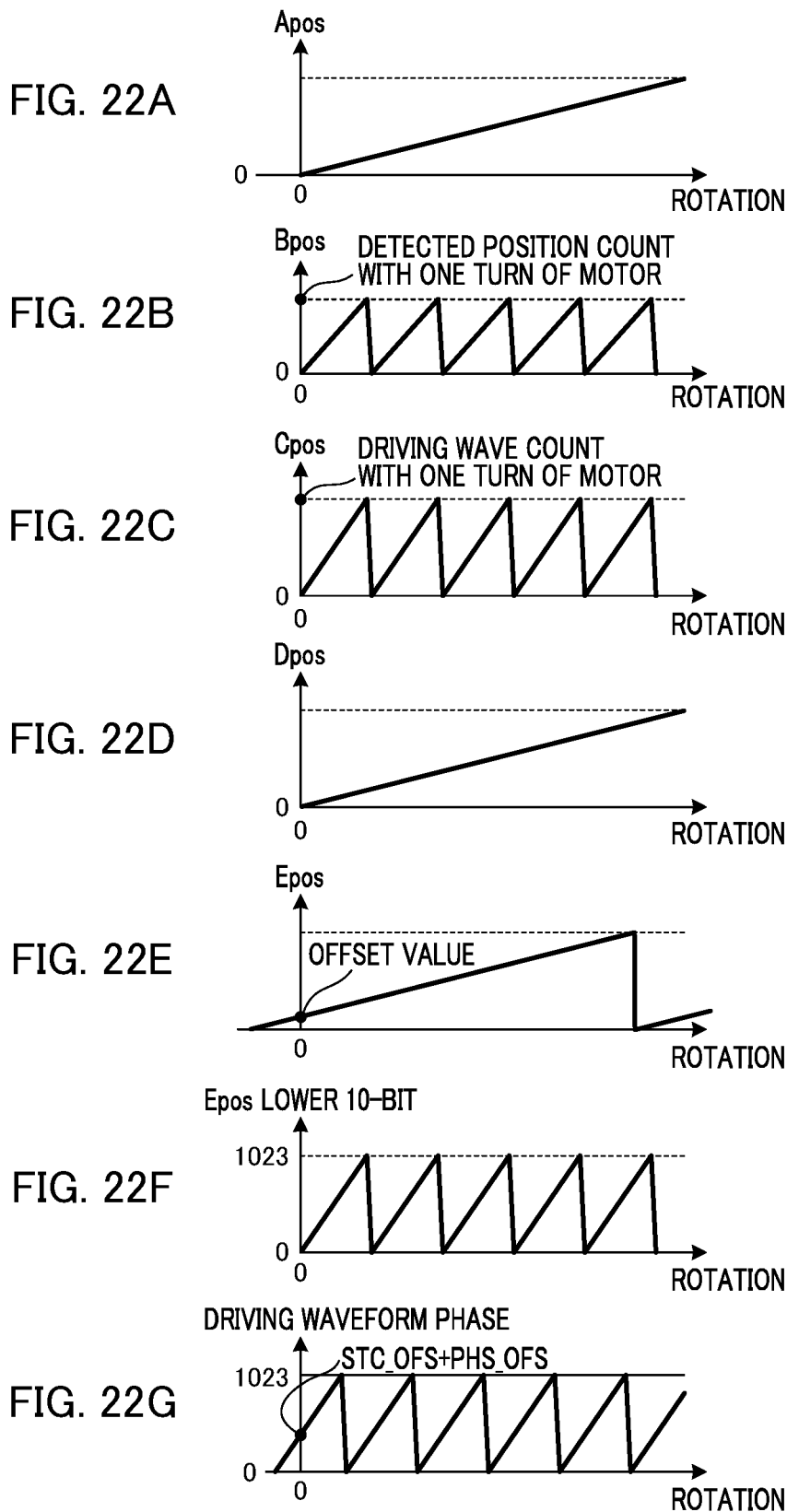
FIGS. 22A to 22G are diagrams illustrating processes which are performed by the position ENC circuit and the driving waveform generating circuit in the fourth embodiment.

FIG. 22A illustrate Apos and FIG. 22B illustrates Bpos. In the graphs illustrated in FIGS. 22A to 22G, the horizontal axis represents a rotation of the rotor. The value of Apos is a count value which is proportional to the rotation of the rotor. The value of Bpos is a signal value of a sawtooth wave which periodically changes between zero and an upper limit value (a maximum value) with the rotation.

When Bpos is generated by the Bpos generating unit 302, the process flow is handed over to the Cpos generating unit 308 illustrated in FIG. 21. The Cpos generating unit 308 multiplies a conversion ratio set in advance using the conversion ratio setting unit 309 by the CPU 111 by the result value of Bpos and stores the value as the calculation result as Cpos. The set conversion ratio is a ratio for converting the detected position count value corresponding to one turn of the rotor into a driving waveform count value corresponding to one turn of the rotor and is acquired using a multiplication number and a right bit shift operation. The shift number of the right bit shift operation is determined on the basis of count conversion accuracy which is required for driving. An example of Cpos is illustrated in FIG. 22C. The value of Cpos is a signal value of a sawtooth wave which periodically changes between zero and an upper limit value with the rotation. That is, the value of Bpos illustrated in FIG. 22B is converted into position information with a value corresponding to a count number of a driving waveform corresponding to one turn of the motor as a Max value as illustrated in FIG. 22C. When the Cpos generating unit 308 generates Cpos, the process flow is handed over to the Dpos generating unit 310.

The Dpos generating unit 310 illustrated in FIG. 21 calculates an integrated value of the rotational position by integrating a position at which the value of Cpos overflows with the driving count value corresponding to one turn or a position at which the value of Cpos underflows. The position information which is generated by the calculation is referred to as Dpos. FIG. 22D illustrates an example of Dpos. The Epos generating unit 311 generates data (referred to as Epos) having an arbitrary offset value with respect to Dpos. Epos can be rewritten with an arbitrary value at an arbitrary time by the CPU 111. At the time of rewriting, a difference between the rewritten value and Dpos is recorded as an offset value in the memory. FIG. 22E illustrates an example of Epos. As illustrated in FIGS. 22D and 22E, the Epos generating unit 311 generates Epos in which the recorded offset value is normally added to the value of Dpos.

The position ENC circuit 109 performs a signal generating process using the Apos generating unit 301 to the Epos generating unit 311. An event which occurs in a comparative example in which the processes of generating Bpos to Epos are not performed will be described now with reference to FIGS. 23A to 23G The horizontal axis in the graphs illustrated in FIGS. 23A to 23G represents a rotational phase of a rotor.

Figure 23:
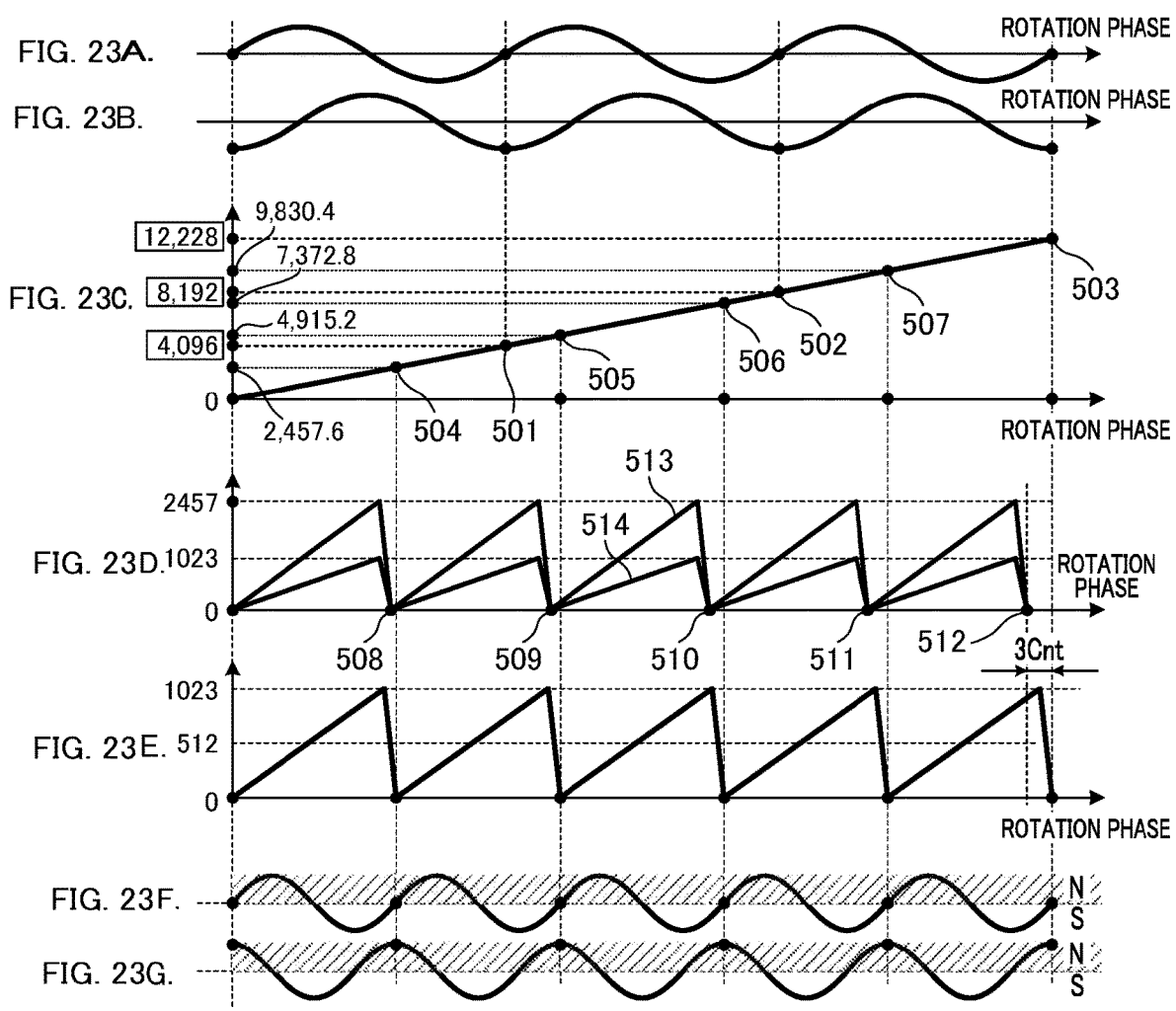
FIGS. 23A to 23G are diagrams illustrating behavior of a motor according to a comparative example.

FIGS. 23A and 23B illustrate two position detection signal and rotational phases corresponding to three cycles of one turn of the motor. In this example, it is assumed that position counts with a resolution of 4096 can be detected in one cycle of a sine wave of the detection signal. FIG. 23C illustrates detected position counts. For each cycle of the position detection signal, 4096 counts are at position 501, 8192 counts are at position 502, and 12288 counts are at position 503. FIGS. 23E, 23F, and 23G illustrate a count value of a driving waveform, an A-phase driving waveform, and a B-phase driving waveform which are to be output to the motor with one turn of the motor, respectively. The phase count value of the driving waveform in this example has a resolution of 1024 in one cycle of an output sine wave. When three cycles of the position detection signal are exactly output, five cycles of the driving waveform are to be exactly output.

In order to synchronize the calculated position count value with the output driving waveform count value, a method of cutting down numerical figures after the decimal point is first considered. It is assumed that only an integer part of 2457.6 obtained by dividing the detected position count 12288 corresponding to one turn of the motor by 5 is taken for synchronization. In this case, in FIG. 23C, one cycle of a driving waveform has to be originally output for each of positions indicated by point 504, point 505, point 506, and point 507, that is, for each position which cannot be detected unless there is a numerical figure after the decimal point as the detected position count, with rotation of the motor. As illustrated in FIG. 23D, a count value indicated by a graph 513 with 2457 as a maximum value is generated from the detected position count, and a count value indicated by a graph 514 is generated by performing a process of multiplying a value corresponding to 1023/2457 thereby. In this case, positions indicated by points 508 to 512 (positions at which one cycle of the driving waveform is output) and positions 504 to 507 and 503 illustrated in FIG. 23C which is considered to be ideal deviate from each other. For example, when a deviation of 0.6×5=3 counts occurs with one turn of the rotor, the deviation is accumulated with the rotation. With 100 turns, the count deviation is 300 counts and the purpose of synchronization between the detected position and the driving waveform is not achieved.

Although an event when a fraction after the decimal point of the detected position is cut down has been described, a method of maintaining synchronization accuracy without performing complicated processes by using accuracy multipliers and dividers may be used for Apos in FIG. 23A. However, when the number of bits of Apos is practically large and a synchronization process is performed by calculating a ratio up to accuracy of one bit for a value having a large number of bits, another event may occur. That is, there is an event of a decrease in synchronism with another block due to an increase in circuit scale and an increase in calculation processing time. Therefore, by employing the configuration according to this embodiment (FIG. 21) as the position ENC circuit 109 and performing the processes of generating Bpos to Epos, it is possible to realize reduction in the processing time and maintenance in detected position accuracy and synchronization accuracy.

Epos information which is generated by the Epos generating unit 311 in FIG. 21 is input to the driving waveform phase determining unit 303. The driving waveform phase determining unit 303 determines phase count information of driving waveforms which are finally applied to the A-phase coil 114 and the B-phase coil 115. The driving waveform phase determining unit 303 outputs a PWM value corresponding to the phase count to the PWM generator 112 in FIG. 1. The driving waveform phase determining unit 303 can switch between OPEN driving in which phase count information is output and position-interlocking driving in which phase count information is output on the basis of the value of Epos in accordance with a command from the OPEN driving count unit 304. The OPEN driving and the position-interlocking driving are switched by causing the CPU 111 to set the driving waveform phase determining unit 303.

When the OPEN driving is performed, the CPU 111 commands a frequency of a driving waveform to the OPEN driving count unit 304 and sets an amplitude gain of the driving waveform in the driving waveform phase determining unit 303. Accordingly, the driving waveform phase determining unit 303 outputs a driving waveform with a desired frequency and desired amplitude. On the other hand, when the position-interlocking driving is performed, the driving waveform phase determining unit 303 calculates a value by adding a predetermined offset value to the lower 10-bit value of Epos. The predetermined offset value is as follows:

a first offset value (STC_OFS value) which is set using the steady-state phase difference setting unit 305 by the CPU 111; and a second offset value (PHS_OFS value) which is set using the driving phase difference setting unit 306 by the CPU 111.

Values to which the offset values are added are calculated and a count value of a driving waveform phase is acquired. An output value of the phase corresponding to the count value is selected as an output value of the driving waveform. This relationship is illustrated in graphs of FIGS. 22F and 22G FIG. 22F illustrates a relationship between the lower 10-bit value of Epos and a rotation. FIG. 22G illustrates a driving waveform after the offset has been added. Both the STC_OFS value and the PHS_OFS value are added to Epos to apply the offset values. As will be described later, STC_OFS serves to manage stable positions of the detected position count and the driving waveform count of the rotor, and PHS_OFS has a function other than management of a phase difference for generating a torque.

The driving waveform generating circuit 110 determines a phase of a driving waveform using the driving waveform phase determining unit 303, the OPEN driving count unit 304, the steady-state phase difference setting unit 305, and the driving phase difference setting unit 306 and outputs a PWM command value corresponding to the driving waveform to the PWM generator 112. The PWM generator 112 outputs a PWM signal to the motor driver 113 in accordance with the PWM command output from the driving waveform generating circuit 110.

Fifth Embodiment

In this embodiment, an example in which reverse rotation is performed using the second driving mode at the time of reverse rotation and the first driving mode and the second driving mode are selectively used depending on the situation at the time of steady rotation will be described. The same elements in this embodiment as in the first to fourth embodiments will not be described and differences therebetween will be mainly described.

This embodiment is based on the premise of a configuration in which the motor driving device is connected to a focusing lens mechanism of an imaging device and a focusing lens moves forward and backward with rotational driving of the motor. At this time, it is assumed that external light which is condensed by the focusing lens can be focused on an image sensor and a focused image can be electrically detected. It is also assumed that image processing is performed on the focused image and an automatic focus evaluation value (hereinafter referred to as an AF evaluation value) indicating how an image is focused can be acquired from contrast information of the image.

Figure 24:
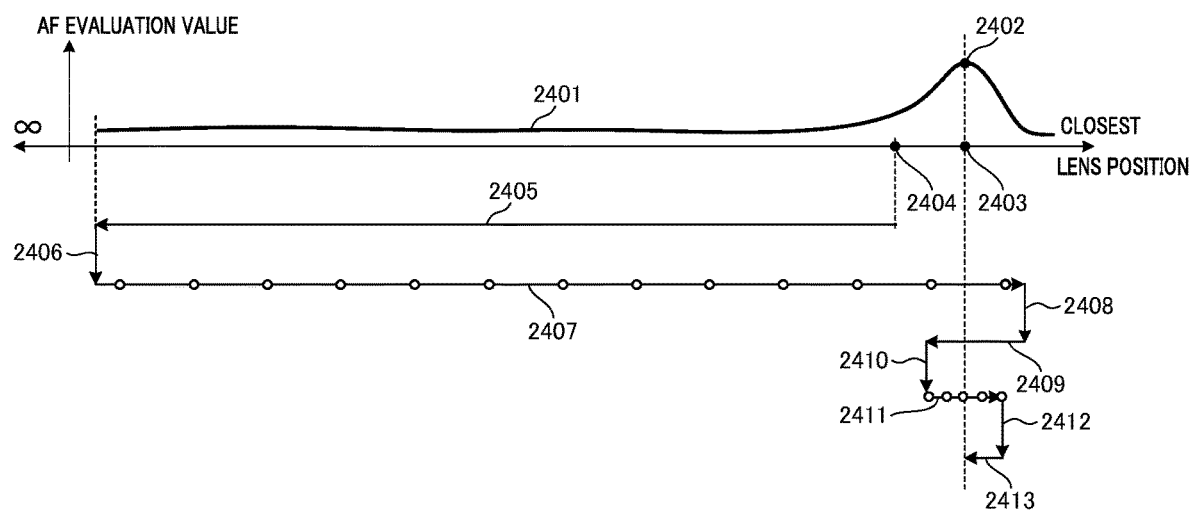
FIG. 24 is a diagram schematically illustrating a motion when a focusing lens is moved.

FIG. 24 is a diagram schematically illustrating a motion when the focusing lens is moved in a focus-in state using an AF evaluation value and movement of lenses in an imaging device. In the graph in an upper part of FIG. 24, the horizontal axis represents a lens position and the vertical axis represents the AF evaluation value. An AF evaluation value curve 2401 indicates how the AF evaluation value changes by moving the focusing lens during capturing of an image in the imaging device. The AF evaluation value curve 2401 has an AF peak value 2402 as a peak value of an evaluation value and a lens position at that time is defined as a lens position 2403.

In this embodiment, a process of setting an initial position of a lens to a lens position 2404, then specifying a lens position 2403 having an AF peak value, and moving the lens to that position will be described. When the lens is located at the lens position 2404 and a command for an automatic focusing operation is received, the lens moves to an AF start position 2405. At this time, since the AF evaluation value is not acquired during movement, the lens operates in the second driving mode in which high-speed driving is possible and this movement is indicated by an arrow 2406. When the lens reaches the AF start position 2405, a reversing operation is started. This reversing operation is indicated by an arrow 2407. At this time, the reversing operation is performed by only adjusting a driving phase difference (PHS_OFS) in the second driving mode. A coarse scanning operation indicated by an arrow 2408 is started after the reversal. In this operation, an AF evaluation value at positions indicated by outlined circles is acquired with high-speed movement in the second driving mode. This operation corresponds to an operation of coarsely searching where a peak of the AF evaluation value is located while moving the lens at a high speed. In this operation, a peak of the AF evaluation value is located around the lens position 2402, and a detailed scanning operation which will be described below is started.

In consideration of a lens position area which is specified in the coarse scanning and which is to be subjected to detailed scanning, the lens is first driven to the scanning start position at a high speed. Accordingly, a reversing operation indicated by an arrow 2409 is performed and then movement indicated by an arrow 2410 representing movement to a detailed scanning start position at a high speed. Both the reversal and movement are performed in the second driving mode.

When the lens reaches the detailed scanning start position, a reversing operation indicated by an arrow 2411 is started. The reversing operation is performed in the second driving mode and later movement in the detailed scanning operation is performed in the first driving mode. In movement indicated by an arrow 2412 representing the detailed scanning operation, the speed of the lens needs to be low in order to finely detect the AF evaluation value. The low-speed movement is driven in the first driving mode, because the speed is relatively stabilized in the first driving mode.

It is assumed that the AF evaluation value can be specified to have the AF peak value 2402 at the lens position 2403 by performing the detailed scanning operation indicated by the arrow 2412 and analyzing change of the AF evaluation value. By this specification, the lens position 2403 is determined as a final stop position of the lens to which the lens is to move.

By determining the final stop position, a reversing operation indicated by an arrow 2413 is started. This reversing operation is performed in the second driving mode again. This is because a stabilization time in which the lens is completely stopped once before the reversal and a mechanical vibrating motion is settled needs to be provided in the first driving mode. When reversal has been completed, movement to a final position indicated by an arrow 2414 is performed. This movement is performed in the first driving mode and the lens stops when the lens reaches the lens position 2403.

In this embodiment, when an operation which is to be performed in the first driving mode and an operation which is to be performed in the second driving mode are to be continuously performed, it is possible to perform all operations at a high speed without providing a stabilization time in which the lens stops to settle mechanical vibration at the time of reversal and switching of a driving mode.

Modified Examples

In the third and fourth embodiments, an example in which the driving phase difference (PHS_OFS) are changed instantaneously from 256 to −256 at time t3 has been described above. However, when PHS_OFS is changed steeply, the change in torque is also steep, behavior of a motor and a mechanism or the like connected to the motor is unstable, and there is a likelihood of vibration or noise occurring. In order to suppress such vibration and noise, a process of gradually changing and switching PHS_OFS which is a phase difference between the detected rotational phase and the driving waveform from 256 to −256 may be performed. The driving phase difference changing time setting unit 307 can be used to set a time required for changing from the phase difference before change to the phase difference after change (a changing time).

The driving phase difference changing time setting unit 307 may determine a changing time depending on a rotational speed detected when a phase difference change start command is issued (when reversal control is started) and set the determined changing time as the changing time. The driving phase difference changing time setting unit 307 may experimentally specify an appropriate changing time of a phase difference corresponding to the rotational speed before the phase difference is changed in advance, prepare a profile, store the profile, and determine an appropriate changing time on the basis of the profile information. The driving phase difference changing time setting unit 307 may determine the changing time depending on the phase difference which is used to issue a phase difference change start command. The driving phase difference changing time setting unit 307 may experimentally specify an appropriate changing time corresponding to the phase difference which is used to start change of the phase difference in advance, prepare a profile, store the profile, and determine an appropriate changing time on the basis of the profile information.

When the motor driving device has a function of fixing a driving direction of a motor, the direction fixing function is temporarily stopped at a time at which it is determined in Step S1611 or S1615 whether the rotational position has reached the reversal start position and the direction fixing function is started again at a time at which it is determined that the driving speed in the reverse direction has reached a predetermined speed. In the direction fixing function, a previous rotational position and a currently set rotational position are compared whenever a rotational position is detected, and the currently set rotation direction is acquired. When the currently set rotation direction does not match the instructed rotation direction, the previous rotation position is used as the current rotation position to generate a driving waveform. Accordingly, the rotation direction of the motor can be fixed to an instructed direction.

A configuration using a Hall element and a rotary magnet is employed by a position detector according to the embodiments, but other sensor mechanisms may be used as long as they can detect a rotational position with sufficiently high accuracy. In the above-mentioned embodiments, a general claw pole type stepping motor with 10 poles has been employed, but the invention can also be applied to other motors in which a rotor side is a permanent magnet and a stator side is a coil stator.

By employing the configurations and processes in the above-mentioned embodiments, it is possible to realize a motor driving device in which a driving waveform has continuity and which can generate a driving waveform with a small reaction delay in a process of generating an efficient driving waveform for a motor on the basis of a detected rotational position from a rotational position detecting mechanism. Since a reversing operation is performed without waiting until rotation of a rotor stops, it is possible to smoothly perform a reversing operation without providing a stop section at the time of a reversing operation.

The motor driving device according to the above-mentioned embodiments can be applied to various devices such as an imaging device, an optical disc device, a printer, and a projector. For example, when the motor driving device is applied to an imaging device, it can be used to drive various optical elements such as a zoom lens, a focusing lens, an optical aperture, and a shutter.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-150571, filed Aug. 9, 2018, Japanese Patent Application No. 2018-224124, filed Nov. 29, 2018 and Japanese Patent Application No. 2019-116463, filed Jun. 24, 2019 which is hereby incorporated by reference wherein in its entirety.

What is claimed is:

1. A motor driving device that rotationally drives a rotor, comprising:
   a generation unit configured to acquire an output of a detection unit detecting a rotational position of the rotor and to generate a driving waveform; and
   a control unit configured to execute control for synchronizing a phase of the rotational position with a phase of the driving waveform,
   wherein the generation unit includes a setting unit configured to set a phase difference between the rotational position and the driving waveform in a state in which the phase of the rotational position and the phase of the driving waveform are synchronized with each other,
   wherein the control unit executes control for switching between a first driving mode in which the rotor rotates in accordance with the driving waveform which is generated by the generation unit without using the output of the detection unit and a second driving mode in which the rotor rotates in accordance with the driving waveform which is generated by the generation unit from the phase difference set by the setting unit using the output of the detection unit, and
   wherein, when a reversal command to a second rotation direction is inputted while the control unit is executing control for causing the rotor to rotate in a first rotation direction in the first driving mode, the control unit executes switching control for a reverse operation, wherein in the switching control, the control unit executes control for switching from the first driving mode to the second driving mode, causes the setting unit to set the phase difference for generating a torque in the second rotation direction, and switches to the first driving mode again after the rotor starts rotating in the second rotation direction from a state where the rotor rotates in the first rotation direction in the second drive mode.

2. The motor driving device according to claim 1, wherein the generation unit includes a determination unit configured to acquire the output of the detection unit, calculates a count value corresponding to rotation of the rotor, and determines the phase of the driving waveform, and
   wherein the setting unit includes:
      a first setting unit configured to set a phase difference between the phase corresponding to the rotational position of the rotor and the phase of the driving waveform in the first driving mode for the determination unit as a phase difference when switching to the second driving mode has been performed; and
      a second setting unit configured to set a driving target phase difference for the determination unit.

3. The motor driving device according to claim 2, further comprising a third setting unit configured to set a changing time for changing from the phase difference set by the first setting unit to the target phase difference set by the second setting unit, wherein the control unit executes control for switching to the second driving mode and changing the phase difference to the target phase difference over the changing time set by the third setting unit when the rotational direction of the rotor is reversed to the second rotation direction.

4. The motor driving device according to claim 1, wherein the control unit executes control for switching to the first driving mode when a direction of a velocity which is calculated from change of the rotational position of the rotor detected by the detection unit is reversed and the velocity reaches a preset velocity in the control for reversing the rotational direction of the rotor.

5. The motor driving device according to claim 3, wherein the third setting unit sets the changing time corresponding to the rotational speed before the rotational direction of the rotor has been reversed or the changing time corresponding to a difference between the rotational speed before the rotational direction of the rotor has been reversed and a target rotational speed after the rotational direction of the rotor has been reversed when control for reversing the rotational direction of the rotor is executed by the control unit.

6. The motor driving device according to claim 3, wherein, when control for reversing the rotational direction of the rotor is executed by the control unit in a state in which an advancing state in which the phase of the driving waveform advances with respect to the phase of the rotational position of the rotor, the third setting unit sets the changing time corresponding to a phase angle indicating an advancing state before the rotational direction of the rotor has been reversed or the changing time corresponding to a difference between the phase angle indicating the advancing state before the rotational direction of the rotor has been reversed and the phase angle indicating the advancing state after the rotational direction of the rotor has been reversed.

7. The motor driving device according to claim 2, further comprising a storage unit configured to store data indicating a relationship between the phase difference and the rotational speed of the rotor,
wherein the second setting unit sets the target phase difference using the data stored in the storage unit.

8. The motor driving device according to claim 1, wherein the control unit executes control for driving the rotor at a constant speed in the first driving mode, executes control for decelerating the rotor, reversing the rotational direction of the rotor, and then accelerating the rotor in the second driving mode, and executes control for switching the second driving mode to the first driving mode and driving the rotor at a constant speed again.

9. The motor driving device according to claim 1, wherein the control unit executes:
first control for, when a reversal command to a second rotation direction is inputted while the control unit is executing the control for causing the rotor to rotate in the first rotation direction in the first driving mode, switching from the first driving mode to the second driving mode, causing the setting unit to set the phase difference for generating a torque in the second rotation direction, and switching to the first driving mode again after the rotor starts rotating in the second rotation direction from a state where the rotor rotates in the first rotation direction in the second drive mode; and
second control for causing the setting unit to set the phase difference for generating a rotational torque in the second rotation direction in a state in which the rotor is rotating in the first rotation direction in the second driving mode and rotating the rotor in the second direction in the second driving mode.

10. A control method which is performed by a motor driving device that rotationally drives a rotor, comprising:
acquiring an output of a detection unit configured to detect a rotational position of the rotor and generating a driving waveform; and
executing control for synchronizing a phase of the rotational position with a phase of the driving waveform,
wherein the acquiring of the output of the detection unit performs a setting process of setting a phase difference between the rotational position and the driving waveform in a state in which the phase of the rotational position and the phase of the driving waveform are synchronized with each other,
wherein the executing of control executes control for switching between a first driving mode in which the rotor rotates in accordance with the driving waveform which is generated in the acquiring of the output of the detection unit without using the output of the detection unit and a second driving mode in which the rotor rotates in accordance with the driving waveform which is generated in the acquiring of the output of the detection unit from the phase difference set in the performing of the setting process using the output of the detection unit, and
wherein, when a reversal command to a second rotation direction is inputted while executing control for causing the rotor to rotate in a first rotation direction in the first driving mode has been executed, the executing of control executes control for switching control for a reverse operation, wherein in the switching control the executing of control executes control for switching from the first driving mode to the second driving mode, driving the rotor in accordance with the driving waveform which is generated by setting the phase difference for generating a torque for reversing the rotation direction of the rotor in the second rotation direction, and switching to the first driving mode again after the rotor starts rotating in the second direction from a state where the rotor rotates in the first rotation direction in the second drive mode.

* * * * *